US012027144B2

(12) United States Patent
Okuyama et al.

(10) Patent No.: US 12,027,144 B2
(45) Date of Patent: Jul. 2, 2024

(54) KEYBOARD DEVICE AND SOUND GENERATION CONTROL METHOD

(71) Applicant: Yamaha Corporation, Shizuoka (JP)

(72) Inventors: Fukutaro Okuyama, Shizuoka (JP); Ryutaro Niiho, Shizuoka (JP); Haruki Uehara, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 18/300,952

(22) Filed: Apr. 14, 2023

(65) Prior Publication Data

US 2023/0252960 A1 Aug. 10, 2023

Related U.S. Application Data

(63) Continuation of application No. 17/125,597, filed on Dec. 17, 2020, now Pat. No. 11,657,786.

(30) Foreign Application Priority Data

Dec. 19, 2019 (JP) ................................ 2019-229187

(51) Int. Cl.
*G10F 1/02* (2006.01)
*G10H 1/00* (2006.01)

(52) U.S. Cl.
CPC ............ *G10F 1/02* (2013.01); *G10H 1/0008* (2013.01); *G10H 1/0066* (2013.01); *G10H 2210/066* (2013.01)

(58) Field of Classification Search
CPC ...... G10F 1/02; G10H 1/0008; G10H 1/0066; G10H 2210/066
USPC .............................................................. 84/13
See application file for complete search history.

(56) References Cited

U.S. PATENT DOCUMENTS 4,469,000 A * 9/1984 Fujiwara .................. G10F 1/02 984/202
5,883,325 A * 3/1999 Peirce .................. G10H 1/0008 84/622
5,922,982 A * 7/1999 Ishibashi ............. G10H 1/0066 84/742

(Continued)

FOREIGN PATENT DOCUMENTS

JP H10288983 A 10/1998
JP H10288983 A * 10/1998

(Continued)

OTHER PUBLICATIONS

First Notification of Examination Opinion in the corresponding Chinese Patent Application No. 202011441635.7, dated May 24, 2023.

*Primary Examiner* — Christina M Schreiber
(74) *Attorney, Agent, or Firm* — Global IP Counselors, LLP

(57) ABSTRACT

A keyboard device includes a plurality of keys, and a keyboard driver configured to drive at least a part of the plurality of keys. The keyboard device is configured such that, in accordance with determination whether a key corresponding to a pitch of event data is drivable by the keyboard driver, sound is generated based on a first sound-generating process in which the keyboard driver is configured to drive the key corresponding to the pitch or a second sound-generating process that is different from the first sound-generating process.

16 Claims, 15 Drawing Sheets

(56) References Cited

U.S. PATENT DOCUMENTS

| | | | | |
|---|---|---|---|---|
| 6,245,983 | B1 * | 6/2001 | Ishiguro | G10H 1/0058 84/478 |
| 6,392,135 | B1 * | 5/2002 | Kitayama | G10H 1/06 84/622 |
| 10,937,403 | B2 * | 3/2021 | Nishida | G10H 1/0556 |
| 11,657,786 | B2 * | 5/2023 | Okuyama | G10H 7/006 84/13 |
| 2001/0037196 | A1 * | 11/2001 | Iwamoto | G10L 25/90 704/207 |
| 2001/0047713 | A1 * | 12/2001 | Muramatsu | G10F 1/02 84/3 |
| 2003/0131717 | A1 | 7/2003 | Shiiya | |
| 2004/0163526 | A1 | 8/2004 | Muramatsu | |
| 2005/0092164 | A1 * | 5/2005 | Fujiwara | G10H 1/0066 84/645 |
| 2009/0038469 | A1 * | 2/2009 | Suzuki | G10H 1/348 84/744 |
| 2010/0300264 | A1 * | 12/2010 | Foster | G10H 1/368 84/610 |
| 2010/0300270 | A1 * | 12/2010 | Applewhite | G10H 1/368 84/610 |
| 2019/0073988 | A1 * | 3/2019 | Ohta | G10H 1/0091 |
| 2019/0295518 | A1 * | 9/2019 | Ishioka | G10H 1/38 |
| 2020/0005746 | A1 * | 1/2020 | Nishida | G10H 7/02 |
| 2020/0005747 | A1 * | 1/2020 | Nishida | G10H 1/053 |
| 2021/0193093 | A1 * | 6/2021 | Okuyama | G10H 1/0066 |
| 2021/0201865 | A1 * | 7/2021 | Uehara | G10G 1/00 |
| 2023/0252960 | A1 * | 8/2023 | Okuyama | G10H 1/0008 84/13 |

FOREIGN PATENT DOCUMENTS

| | | | | | |
|---|---|---|---|---|---|
| JP | 2001343972 | A | | 12/2001 | |
| JP | 3543126 | B2 | * | 7/2004 | |
| JP | 3543126 | B2 | | 7/2004 | |
| JP | 2004252302 | A | | 9/2004 | |
| JP | 3659220 | B2 | | 6/2005 | |
| JP | 3659220 | B2 | * | 6/2005 | |
| JP | 3885587 | B2 | | 2/2007 | |
| JP | 3885587 | B2 | * | 2/2007 | G10H 1/0041 |
| JP | 2007140067 | A | * | 6/2007 | |
| JP | 2007140067 | A | | 6/2007 | |
| JP | 2009265650 | A | | 11/2009 | |
| JP | 2019168592 | A | | 10/2019 | |
| JP | 2019168592 | A | * | 10/2019 | G10H 1/0008 |

* cited by examiner

KEYBOARD DEVICE AND SOUND GENERATION CONTROL METHOD

CROSS-REFERENCE TO RELATED APPLICATIONS

This application is a continuation application of U.S. patent application Ser. No. 17/125,597, filed on Dec. 17, 2020, which claims priority to Japanese Patent Application No. 2019-229187, filed on Dec. 19, 2019. The entire disclosures of U.S. patent application Ser. No. 17/125,597 and Japanese Patent Application No. 2019-229187 are hereby incorporated herein by reference.

BACKGROUND

Technical Field

The present invention relates to a keyboard device for driving keys of a keyboard instrument and a sound generation control method thereof.

In order for an acoustic piano to have an automatic performance function, a key bed under the keys is carved out to create a space, and a key driving device (key drive unit) that has solenoids for driving the keys is attached to the space. This key driving device causes a solenoid to operate by means of a control signal corresponding to the performance content to transmit the driving force from the lower surface side of the keys near the rear-end portion (back check side) of each key. As a result, the key is driven as if depressed by a performer, and the hammer strikes a string to generate sound (see, for example, Japanese Laid-Open Patent Application No. 2004-252302 and Japanese Laid-Open Patent Application No. 2001-343972).

SUMMARY

In some acoustic pianos, both ends of a keyboard are located above legs. In this case, it is necessary to process the upper portion of the legs and to insert a key driving device for driving the two end portions of the keyboard, but due to the configuration of an acoustic piano, there are cases in which the upper portion of the legs cannot be processed. For example, if there is a connecting part that connects the key bed and the leg top block, such as a bolt, it is not possible to process the upper portion of the leg, and the key driving device for driving both end portions of the keyboard cannot be provided. In addition, there are cases in which the operation of the key driving device will become locked due to the activation of a safety device because of overheating or due to a malfunction of the key driving device itself. In such cases, the keys cannot be driven by the key driving device.

One object of this disclosure is to provide a keyboard device having a key driving device that can generate sound even if the keys cannot be driven, for example, because a key driving device for driving the keys cannot be provided.

According to one aspect of this disclosure, a keyboard device comprises a plurality of keys and keyboard driver configured to drive at least a part of the plurality of keys. The keyboard device is configured such that, in accordance with determination whether a key corresponding to a pitch of event data is drivable by the keyboard driver, sound is generated based on a first sound-generating process in which the keyboard driver is configured to drive the key corresponding to the pitch or a second sound-generating process that is different from the first sound-generating process.

In addition, according to one aspect of this disclosure, a sound generation control method comprises generating sound based on a first sound-generating process by driving a key corresponding to a pitch of event data or a second sound-generating process that is different from the first sound-generating process, in accordance with determination whether the key corresponding to the pitch is drivable by a keyboard driver.

In addition, according to one aspect of this disclosure, a non-transitory computer readable medium storing a program that causes a computer to execute a process that includes generating sound based on a first sound-generating process by driving a key corresponding to a pitch of event data or a second sound-generating process that is different from the first sound-generating process, in accordance with determination whether the key corresponding to the pitch is drivable by a keyboard driver.

According to this disclosure, it is possible to generate sound by means of prescribed processes, even when a specific key cannot be driven, even though a key driving device is provided.

EMBODIMENTS FOR IMPLEMENTING THE INVENTION

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

First Embodiment

Structure of Keyboard Device

Figure 1:
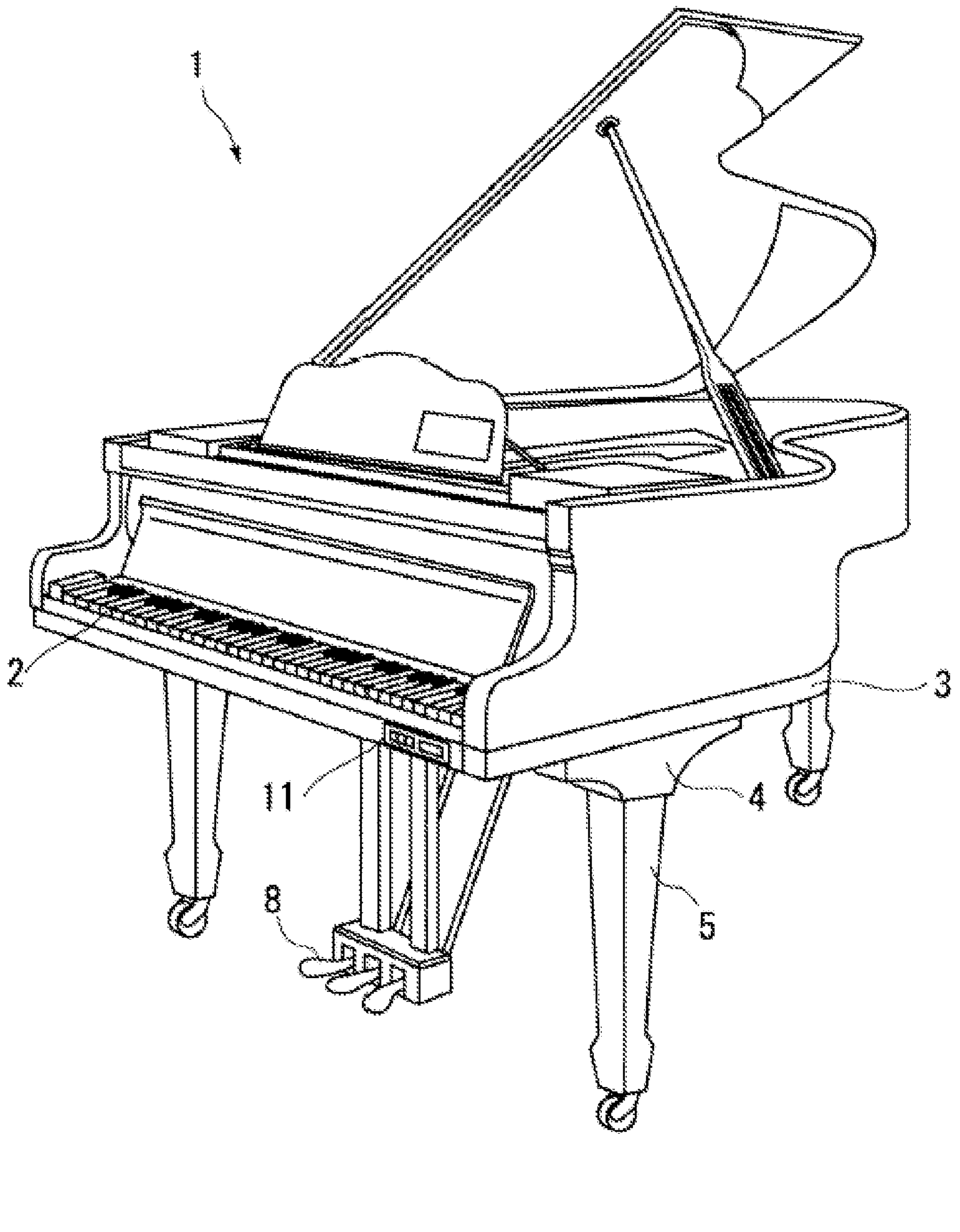
FIG. 1 is a diagram explaining the appearance of a keyboard device.

FIG. 1 is a diagram explaining the appearance of a keyboard device 1 according to a first embodiment. The keyboard device 1 has a keyboard 2 in which a plurality (88 in this example) of keys 20 are arranged side by side on the front, a key bed 3 located below the keyboard 2, a leg top block 4 that connects a leg portion 5 and the key bed 3, pedals 8, and an electronic controller 11. The leg top blocks 4 are located at both ends in the direction in which keys 20 of the keyboard 2 are arranged (left and right ends of the keyboard device 1). That is, parts of both ends of the keyboard 2 are configured to be positioned via the key bed 3 above the leg top blocks 4. In the present embodiment, the keyboard device 1 is configured by attaching a key driving device for driving the keys 20 to a conventional grand piano.

Structure of Key Driving Device

Figure 2:
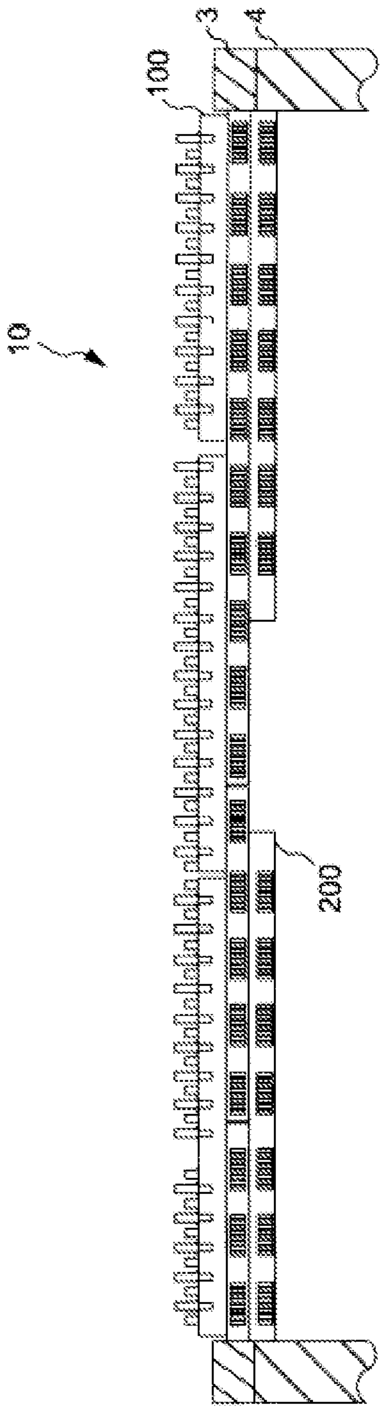
FIG. 2 is a diagram explaining the positional relationship between a key bed, a leg top block, and a key driving device when the keyboard device is viewed from the front.

A key driving device (key driver) 10 attached to the keyboard device 1 will be described. The key driving device (key driver) 10 drives at least a part of the plurality of keys 20. First, the position of the key driving device 10 will be described with reference to FIGS. 2, 3A, and 3B. FIG. 2 is a diagram explaining the positional relationship between the key bed 3, the leg top block 4, and key driving device 10 when the keyboard device 1 of the present embodiment is viewed from the front. The key driving device 10 has a solenoid housing part 100 and a substrate housing part 200. The solenoid housing part 100 houses solenoids, which are one example of actuators that impart a driving force to the keys 20 (refer to FIG. 3A) to drive the keys 20. The substrate housing part 200 houses a printed circuit board for supplying control signals from the electronic controller 11, and the like. As shown in FIG. 2, the key driving device 10 is not provided at a portion where the leg top block 4 is attached.

Figure 3A:
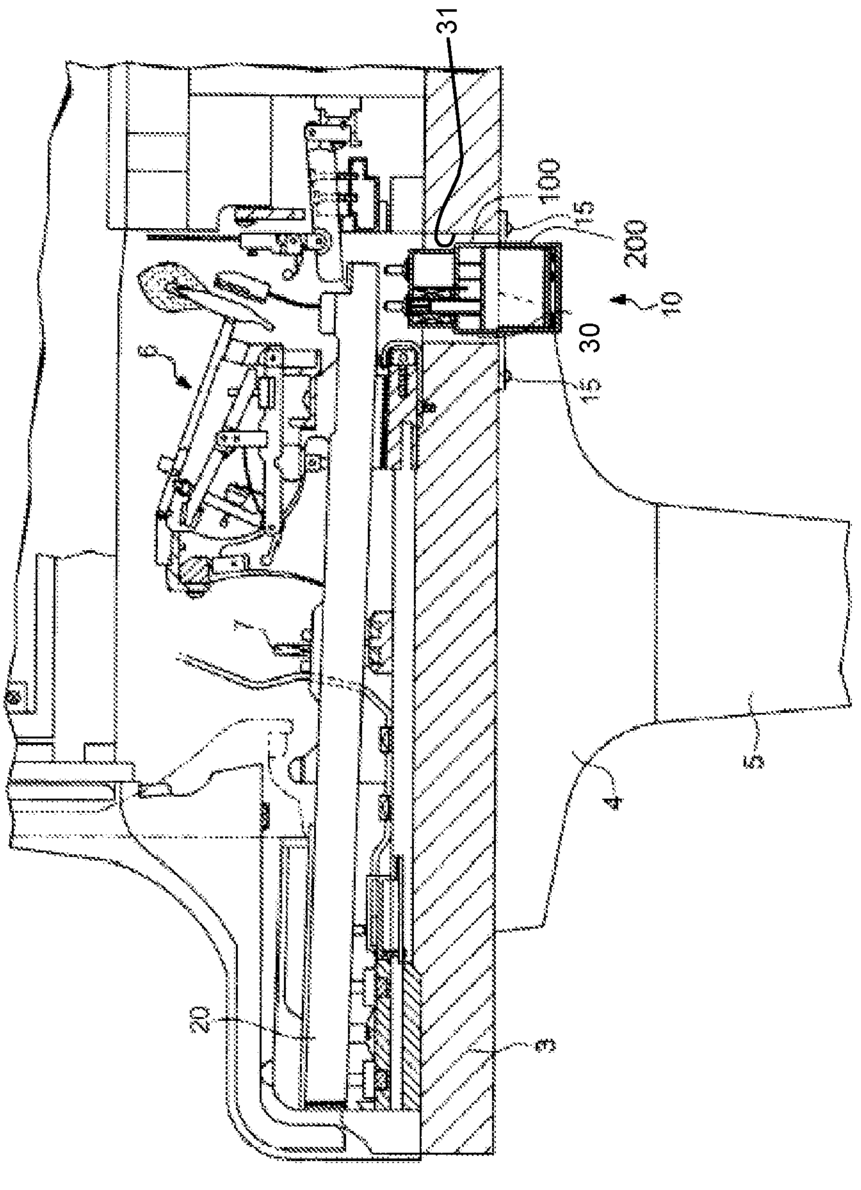
FIG. 3A is a diagram explaining the cross-sectional configuration of a portion of the keyboard device not including the leg top block.

FIG. 3A is a diagram explaining the cross-sectional configuration of a portion of the keyboard device 1 of the present embodiment not including the leg top block 4. This cross-sectional configuration shows a configuration of the cross section along the direction in which the keys 20 extend when viewed from the direction in which the keys 20 are arranged. The key 20 is supported by a balance pin 7 so as to be freely turnable. When the front-end portion of the key 20 (side depressed by a performer (left side in FIG. 3A)) is depressed, the key 20 turns about the balance pin 7, and the rear-end portion of the key 20 (end portion on the opposite side of the front-end portion with respect to the balance pin 7) rises. Then, an action mechanism 6 is operated and the hammer strikes a string to generate sound.

The key bed 3 has a slot 31 that defines a space 30 and is formed below the rear-end portion of the keys 20. This slot 31 (space 30) is formed by carving out a portion of the key bed 3 so as to penetrate therethrough in the vertical direction. The space 30 has an essentially rectangular parallelepiped shape extending along the direction in which the keys 20 are arranged. The key driving device 10 is screwed to the key bed 3 by means of screws 15 and fixed to the key bed 3 such that the solenoid housing part 100 is housed in the space 30. The key driving device 10 causes a solenoid to operate based on a control signal from the electronic controller 11 and turns the key 20 by pushing the rear-end portion of the key 20 up, to realize the same operation that is performed when a performer depresses the front-end portion of the key 20.

Figure 3B:
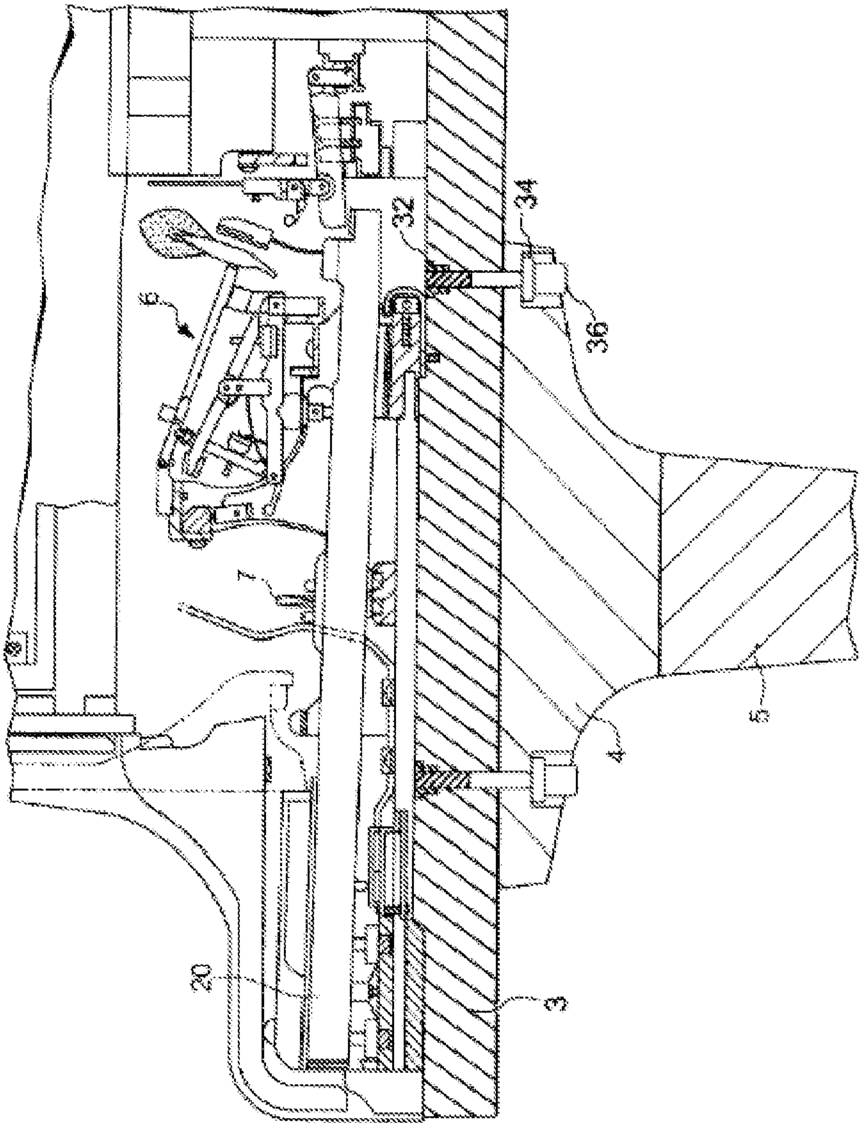
FIG. 3B is a diagram explaining the cross-sectional configuration of a portion of the keyboard device including the leg top block.

FIG. 3B is a diagram that shows the cross-sectional configuration of a portion of the keyboard device 1 of the present embodiment including the leg top block 4. Unlike the case shown in FIG. 3A, there is a leg top block 4 below the key bed 3. As shown in FIG. 3B, in the keyboard device 1 an embedded nut 32 is provided in a portion of the key bed 3 to which the leg top block 4 is attached. A mounting bolt 36 is provided in a portion of the leg top block 4 opposing the embedded nut 32 via a washer 34. The mounting bolt 36 is attached and fastened to the embedded nut 32 provided in the key bed 3 in order to fix the leg top block 4 to the key bed 3. A cushioning material (not shown) made of resin, or the like, may be provided between the washer 34 and the leg top block 4.

Figure 4:
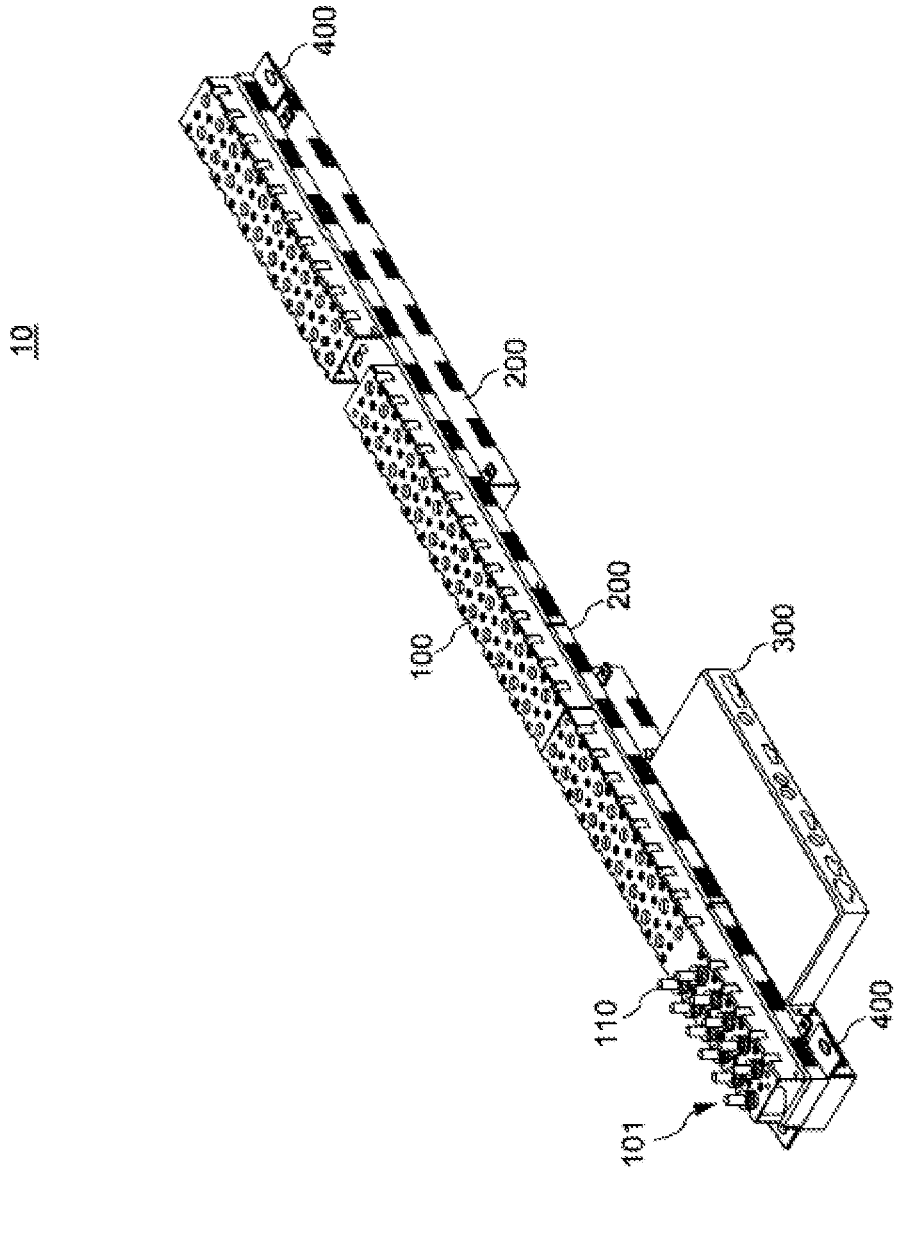
FIG. 4 is a diagram explaining the configuration of the key driving device.

FIG. 4 is a diagram explaining the configuration of the key driving device 10 according to the present embodiment. FIG. 4 is a perspective view of the key driving device 10. The key driving device 10 has openings 400 for threaded fasteners for connection and fixing to the key bed 3 on the upper surface side of the substrate housing part 200 (on the side of the solenoid housing part 100). In addition, distal end portions of plungers 110 of solenoids 101 that impart driving force to the keys 20 project from the upper surface side of the solenoid housing part 100. The solenoid housing part 100 has a shape extending in one direction so as to house these solenoids 101 arranged in two rows along the direction in which the keys 20 are arranged. In FIG. 4, parts of the solenoids 101 that are housed in the solenoid housing part 100 are omitted. In addition, the key driving device 10 is equipped with a drive unit 300 that is electrically connected. The drive unit 300 includes a control circuit and a PWM generator 102 that generates drive current for operating the solenoids based on a control signal from the electronic controller 11.

When drive current is supplied to the solenoid 101, the plunger 110 rises and pushes one end of the key 20 (rear end portion) to turn the key 20, and the other end of the key 20 (front end portion) is pushed down. As a result, a hammer 9 is turned and strikes a string to generate sound. The use of such an operation of the solenoids 101 to cause the keyboard device 1 to generate sound in accordance with music data is called automatic performance. On the other hand, the generation of sound by means of the pressing of the other end portion of the key 20 (front-end portion) by a performer in order to turn the hammer (not shown) and strike a string is called manual performance.

As shown in FIG. 3B, if there is a connecting part that connects the key bed 3 and the leg top block 4, such as the mounting bolt 36, it is not possible to process key bed 3 located above the leg top block 4. Therefore, it is not possible to provide the space 30 for housing the key driving device 10. Accordingly, it is not possible to dispose the solenoids 101 for driving the keys 20 of the keyboard device 1 located above the leg top block 4. Since leg top blocks 4 are respectively provided at both ends/of the keyboard device 1 in the direction in which the keys 20 are arranged, it is not possible to provide solenoids 101 for driving some of the keys 20 at the two end portions of the keyboard 2, that is, some of the keys 20 corresponding to the high notes and some of the keys 20 corresponding to the low notes located at the two ends of the keyboard 2. Therefore, the keys 20 for which the corresponding solenoids 101 are not provided cannot be driven at the time of the automatic performance.

Configuration of Keyboard Device

Figure 5:
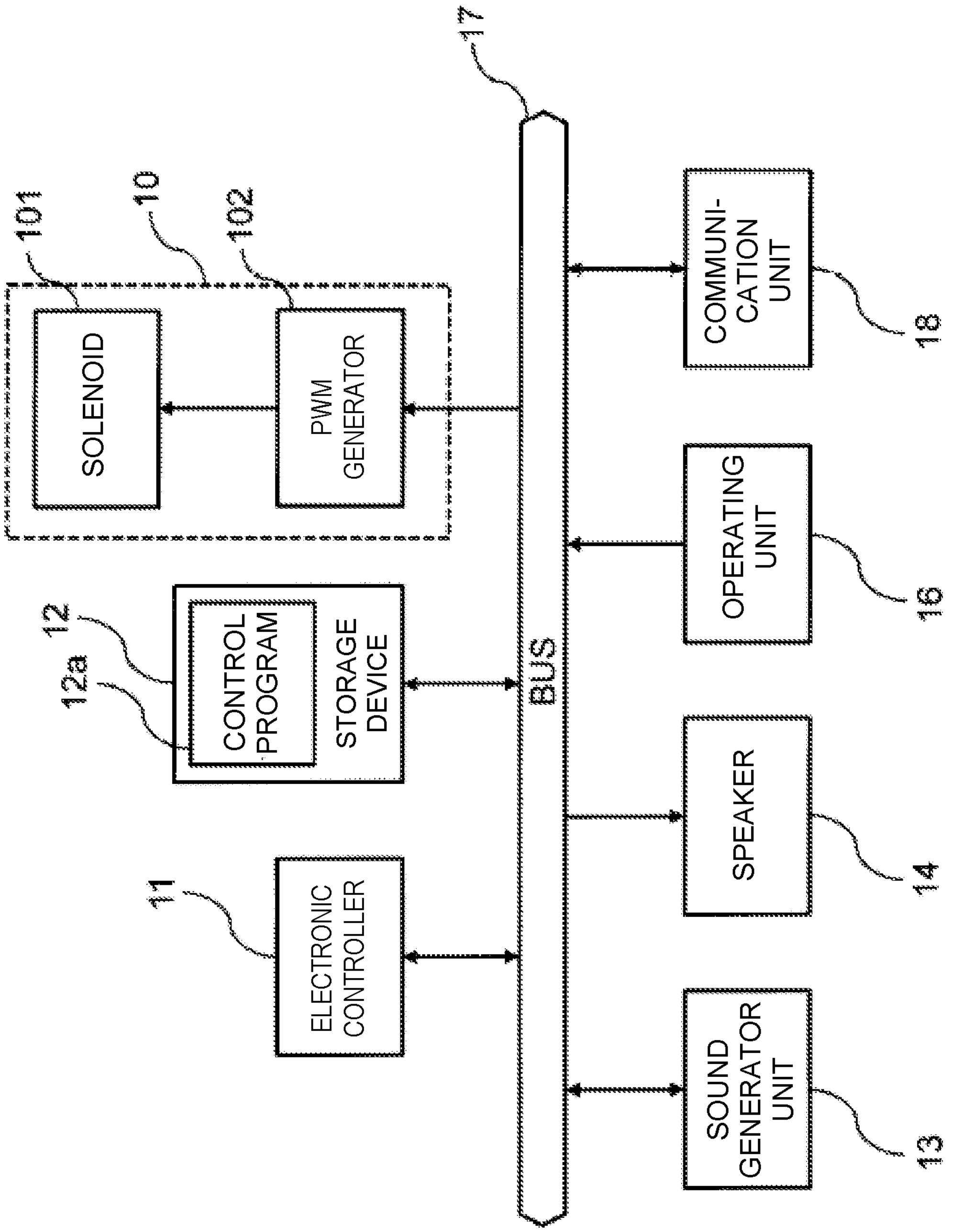
FIG. 5 is a block diagram illustrating the functional configuration of the keyboard device.

The functional configuration of the keyboard device 1 will be described. FIG. 5 is a block diagram illustrating the functional configuration of the keyboard device 1. The keyboard device 1 has the key driving device 10, the electronic controller 11, and a storage device 12. In addition, the keyboard device 1 may optionally include a sound generator unit (sound generator circuit) 13, a speaker 14, an operating unit 16, and a communication unit 18. These components are interconnected via a bus 17.

The electronic controller 11 has at least one processor. More specifically, the electronic controller 11 has an arithmetic processing circuit such as a CPU (Central Processing Unit). The term "electronic controller" as used herein refers to hardware that executes software programs. The electronic controller 11 causes the CPU to execute a control program 12*a* stored in the storage device 12 to realize various functions in the keyboard device 1. The functions to be realized include the automatic performance function. Specifically, the electronic controller 11 acquires performance information in a MIDI (Musical Instrument Digital Interface) format, or the like, and outputs a control signal to the key driving device 10 for instructing the driving mode for the keys 20 in accordance with this performance information. The performance information may be input from the outside via the communication unit 18 or prestored in the storage device 12.

The storage device 12 is a storage medium such as a nonvolatile memory or a hard disk. The storage device 12 can be any computer storage device or any computer readable medium with the sole exception of a transitory, propagating signal. The storage device 12 stores the control program 12*a* for realizing the automatic performance function. The control program 12*a* may be stored in a computer-readable recording medium, such as a magnetic recording medium, an optical recording medium, a magneto-optical recording medium, or a semiconductor memory. In this case, the keyboard device 1 need only be equipped with a device that can read the recording medium. In addition, the control program 12*a* may be downloaded via a network, such as the Internet, via the communication unit 18.

In addition, the storage device 12 may store the performance information. The performance information is music data that are played by the keyboard device 1. The performance information may be data expressed in the MIDI format, such as SMF. The performance information may be downloaded via the communication unit 18 via a network such as the Internet. The performance information may be categorized as stored as a master track, a plurality of note sequence tracks, and effect tracks.

Time signature event data, tempo event data, pedal event data, and the like are stored over time in the master track in accordance with the progression of a musical piece. The time signature event data include timing data indicating the timing at which the time signature in the musical piece is changed, and time signature data which represent the changed time signature. These timing data and various timing data described further below represent the progress position in the musical piece and are composed of data representing the number of bars from the beginning of the musical piece, the number of beats from the beginning of each bar, and the timing within the beat. Tempo data are composed of timing data representing the timing at which the tempo of the musical piece is changed and tempo data, which represent the changed tempo of the musical piece. The pedal evet data include timing data indicating that timings at which the damper pedal and the soft pedal are operated in the musical piece.

A series of note event data for controlling the generation of sound are stored over time in the note sequence track in accordance with the progression of the musical piece. Each piece of note event data includes timing data representing the sound generating timing of the sound, pitch data representing the pitch of the sound, velocity data representing the operating speed (that is, key pressing speed) of a performance operator for controlling the volume of the sound, or the like, and gate time data representing the key-on time of the sound.

Effect event data are stored over time in the effect track in accordance with the progression of the musical piece. Each piece of effect event data includes effect data for changing effects representing the modes in which elements of the generated sound are changed, such as the sound generating timing, the velocity (volume), the gate time (key-on time), etc., of the sound that is generated in accordance with the pitch data, and timing data representing the timings of said changes. Performance information including the master track, the note sequence track, and the effect track are also referred to hereinbelow as event data.

In addition, the storage device 12 may store waveform data and parameters used by the sound generator unit 13, and the like. These waveform data are waveform data obtained by sampling sounds of an acoustic piano (sounds generated by strings being struck as keys are pressed). Waveform data of different pitches are stored in correspondence with key numbers (note numbers).

The sound generator unit 13 generates a sound signal based on the performance information and outputs the generated sound signal to the speaker 14. Specifically, based on the performance information, the sound generator unit 13 reads waveform data representing string-striking sounds of a piano stored in the storage device 12. The sound generator unit 13 is a processing circuit including a sound generator such as a sound generator LSI (large-scale integration) that generates the sound signal and a peripheral circuit that operates the sound generator. For example, a PCM (pulse code modulation) generator or an FM (frequency modulation) generator, which is used for an electronic instrument or a DTM (Desktop Music), is used as the sound generator. The speaker 14 amplifies and outputs the sound signal output from the sound generator unit 13 to generate a sound corresponding to the sound signal.

The operating unit 16 includes operators for carrying out various settings, such as adjusting the volume. The operating unit 16 may include a display unit (display) (not shown) that displays the control state, setting contents, and control contents of the keyboard device 1. The display unit may be composed of a liquid-crystal display device (LCD), an organic EL, or the like.

The communication unit 18 is an interface for sending and receiving control programs, various data related thereto, event information corresponding to the performance operation, etc., between the keyboard device 1 and an unillustrated external device (for example, a server or a MIDI device). The communication unit 18 may be an interface such as a MIDI interface, LAN, Internet, telephone line, or the like. In addition, the communication unit 18 may be a wired interface or a wireless interface.

Automatic Performance Function

The automatic performance function executed by the keyboard device 1 will be described. The automatic performance function is realized by the control program 12*a* that is stored in the storage device 12 and that is executed by the electronic controller 11 of the keyboard device 1. Some or all of the configurations for realizing the automatic performance function described below may be realized in hardware. In this disclosure, the keyboard device 1 is configured such that sound is generated based on a first sound-generating process in which the keyboard driver drives a key corresponding to a first pitch, when performance data including the first pitch is received, and the keyboard device 1 is configured such that sound is generated based on a second sound-generating process that is different from the first sound-generating process, when performance data including a second pitch that is different from the first pitch is received. In particular, the electronic controller 11 is configured to generate, based on the first pitch, a first control signal to control the keyboard driver to drive the key corresponding to the first pitch, upon receiving the performance data including the first pitch in the first sound-generating process, and generate a signal (a second control signal or sound generator event signal) that is different from the first control signal upon receiving the performance data including the second pitch in the second sound-generating process.

Figure 6:
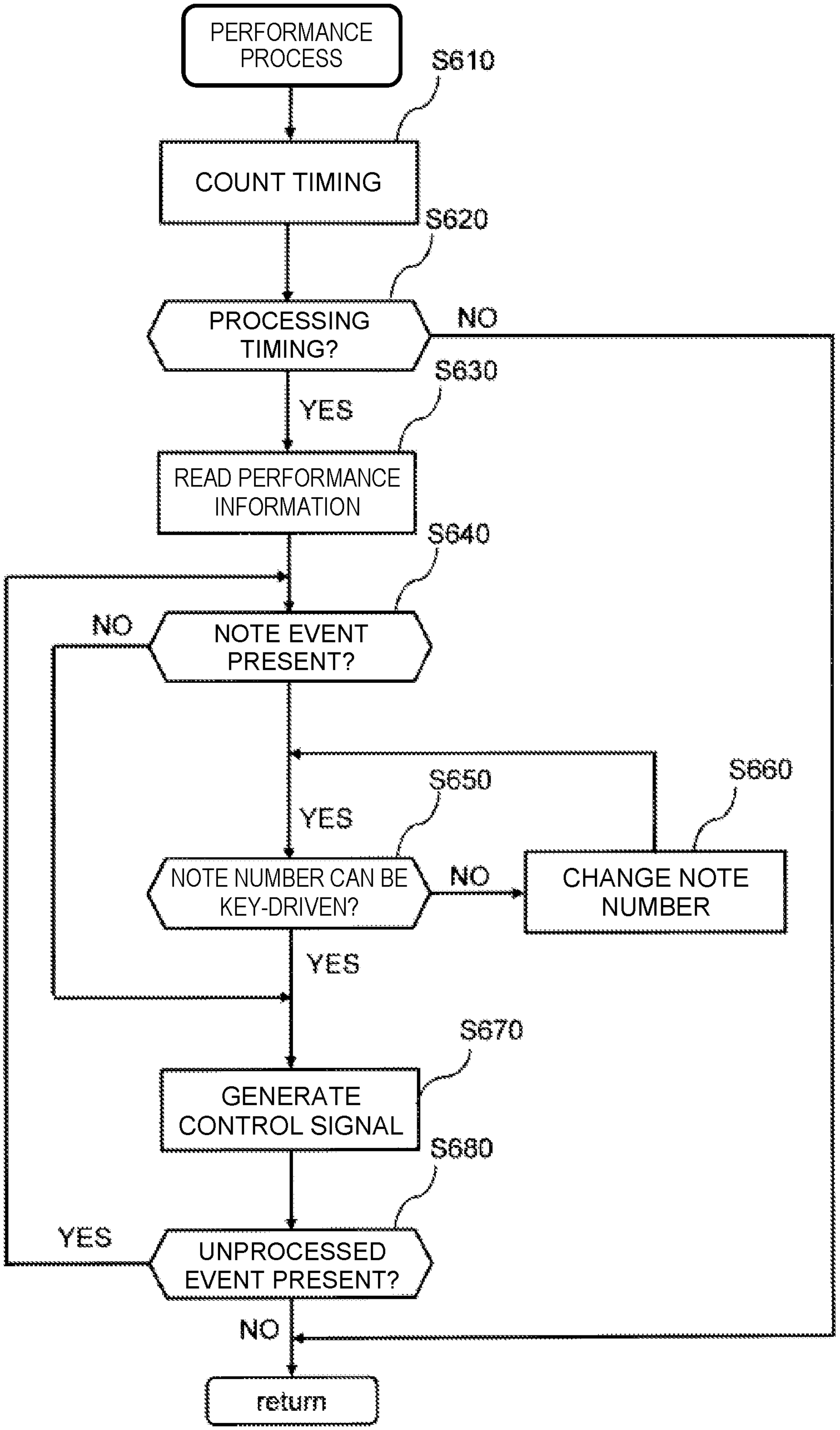
FIG. 6 is a flowchart illustrating the process of an automatic performance function according to a first embodiment that is executed by an electronic controller.

FIG. 6 is a flowchart showing a process that is executed by the electronic controller 11. The process of an automatic performance function 60 that is executed by the electronic controller 11 will be described with reference to FIG. 6. The electronic controller 11 executes a performance process based on instruction information that is input by a user via the operating unit 16 of the keyboard device 1, or the like. The instruction information includes musical piece designation information for designating the musical piece to be reproduced, and reproduction information for instructing the execution of the performance process. The instruction information may be MIDI format information. When the performance process is operated, the reading out of event data corresponding to the musical piece designation information from the storage device 12 is started, and the counting of timing data including step time and gate time (subtraction process of the timing data) is carried out (S610). Then, it is determined whether the timing data being read out have reached a processing timing for processing the event (S620). If the processing timing has not been reached (S620; NO), the electronic controller 11 continues to determine whether the timing data being read out have reached the processing timing.

If it is determined that the timing data have reached the processing timing (S620; YES), the corresponding event data (performance information, performance data) are read from the storage device 12 (S630). It is then determined whether the event data that have been read out include note event data (S640).

If the event data do not include the note event data (S640; NO), a control signal is generated based on the event data that have been read out (S670). On the other hand, if the event data include the note event data (S640; YES), it is determined whether the note number of the pitch data included in the note event data is included in a drivable sound range or a non-drivable sound range (S650). As described above, in the keyboard device 1, it is not possible to provide solenoids 101 for driving some of the keys 20 corresponding to the high notes and some of the keys 20 corresponding to the low notes located at the two ends (above the leg top blocks 4) of the keyboard 2. Therefore, the keys 20 for which the corresponding solenoids 101 are not provided cannot be driven at the time of the automatic performance. Here, the sound range for which corresponding solenoids 101 are provided, and in which sounds are generated by keys that can be driven by the corresponding solenoids 101 at the time of the automatic performance is called the drivable sound range, and the sound range in which sounds are generated by keys that cannot be driven by the solenoids 101 is called the non-drivable sound range. The pitches included in the drivable sound range may be pitches that are greater than or equal to a first note number and less than or equal to a second note number. The pitches included in the non-drivable sound range may be pitches that are lower than the first note number or higher than the second note number. A pitch included in the drivable sound range is called a first pitch, and a pitch included in the non-drivable sound range, that is, other than the first pitch, is called a second pitch.

If the note number of the pitch data included in the note event data is a first pitch, that is, if it is included in the drivable sound range (S650; YES), a control signal for driving the solenoid 101 of the key driving device 10 is generated based on the note event data (S670). On the other hand, if the note number of the pitch data included in the note event data is a second pitch, that is, if it is included in the non-drivable sound range (S650; NO), the note number of the pitch data is converted into another note number (S660). That is, the pitch of a key for which a corresponding solenoid is not provided is converted into the pitch of another key. For example, the note number of the pitch data may be converted into a sound with the same pitch name by increasing or decreasing the pitch by one octave.

It is then again determined whether the note number of the converted pitch data is included in the drivable sound range or the non-drivable sound range (S650). If the note number of the converted pitch data is a first pitch, that is, if it is included in the drivable sound range, a control signal for driving the solenoid 101 of the key driving device 10 is generated based on the note event data including the converted pitch data (S670). On the other hand, if the note number of the converted pitch data is a second pitch, that is, if it is included in the non-drivable sound range, the note number of the pitch data is further converted. This process is repeated until it is determined that the note number of the converted pitch data is a first pitch, that is, that it is included in the drivable sound range.

It is determined whether an unprocessed event is included in the event data that have been read out (S680), and if an unprocessed event is included (S680; YES), the process returns to Step S640. The process of S640 to S680 is repeated until there are no unprocessed events. When there no longer are any unprocessed events (S680; NO), the electronic controller 11 returns to S610, subtracts the timing data until the next processing timing is reached to determine the next processing timing.

Figure 7:
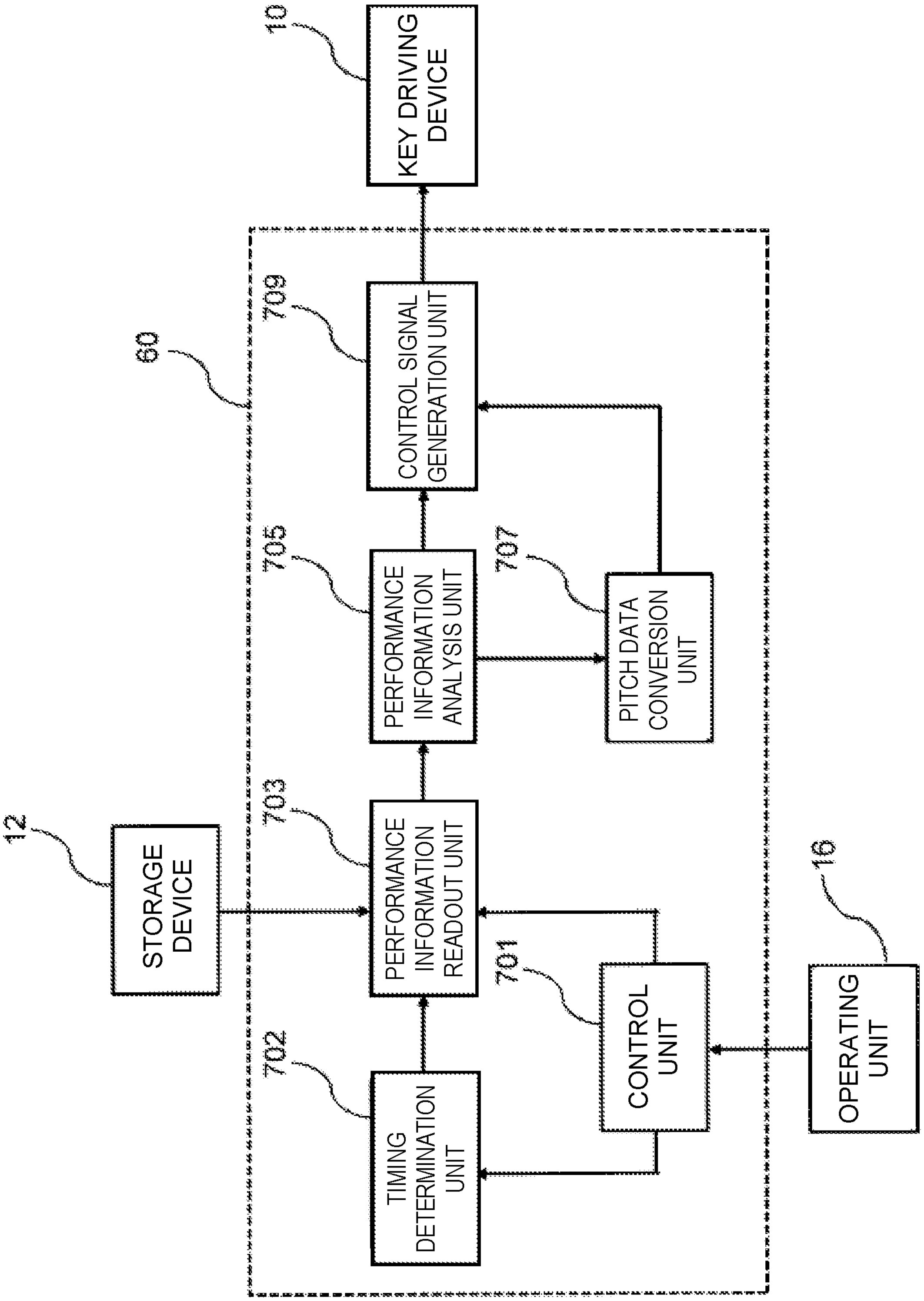
FIG. 7 is a block diagram illustrating the configuration of the automatic performance function according to the first embodiment.

FIG. 7 is a block diagram illustrating the configuration of the automatic performance function 60 according to the present embodiment. Referring to FIG. 7, the electronic controller 11, which is configured to execute the automatic performance function 60, includes a control unit 701, a timing determination unit 702, a performance information readout unit 703, a performance information analysis unit 705, a pitch data conversion unit 707, and a control signal generation unit 709.

Based on the instruction information that is input by the user via the operating unit 16 of the keyboard device 1, or the like, the control unit 701 generates performance reproduction information and supplies the generated performance reproduction information to the timing determination unit 702. In addition, based on the instruction information that is input by the user, the control unit 701 supplies the musical piece designation information to the performance information readout unit 703 for designation of the performance information to be read out. The instruction information that is input by the user may be information in the MIDI format.

The timing determination unit 702 receives the performance reproduction information, counts the timing data, and determines whether the processing timing for processing the event has been reached. If the processing timing has been reached, the timing determination unit 702 transmits a start signal to the performance information readout unit 703 for starting the readout of the performance information (event data).

When the start signal is received, the performance information readout unit 703 reads event data corresponding to the processing timing from the storage device 12 based on the musical piece designation information. The performance information readout unit 703 transmits the event data that have been read to the performance information analysis unit 705.

The performance information analysis unit 705 receives event data from the performance information readout unit 703 and analyzes the received event data. The performance information analysis unit 705 determines whether the received event data include note event data. If the received event data do not include the note event data, the performance information analysis unit 705 transmits the event data to the control signal generation unit 709.

If the event data include the note event data, the performance information analysis unit 705 determines whether the note number of the pitch data included in the note event data is a first pitch, that is, whether it is included in the drivable sound range, or a second pitch, that is, whether it is included in the non-drivable sound range. If the note number of the pitch data is a first pitch, that is, if it is in the drivable sound range, the performance information analysis unit 705 transmits the note event data to the control signal generation unit 709 as is. On the other hand, if the note number of the pitch data is a second pitch, that is, if it is included in the non-drivable sound range, the performance information analysis unit 705 transmits the note event data to the pitch data conversion unit 707.

The pitch data conversion unit 707 converts pitch data whose note number is a second pitch, that is, that is included in the non-drivable sound range, to a note number that is a first pitch, that is, that is included in the drivable sound range. That is, the pitch data conversion unit 707 converts the pitch of a key for which a corresponding solenoid is not provided into the pitch of a key for which a corresponding solenoid is provided, which can be automatically played by the solenoid. For example, the pitch data conversion unit 707 may convert the note number of the pitch data such that the pitch increases or decreases by one octave. The pitch data conversion unit 707 transmits the event data including the converted pitch data to the control signal generation unit 709.

The control signal generation unit 709 generates a control signal based on the received event data. The control signal can be of various types for automatically performing the musical piece. For example, the control signal includes a control signal for driving the solenoids 101 of the key driving device 10, a control signal for driving a pedal driving device, which is not shown, and the like. The control signal generation unit 709 can generate a control signal for driving the solenoids 101 based on the note event data. If the note number of the pitch data included in the original note event data is a first pitch, that is, if it is included in the drivable sound range, the control signal generation unit 709 generates a control signal (first control signal) for driving the solenoid 101 of the key driving device 10 based on the original note event data. On the other hand, if the note number of the pitch data included in the original note event data is a second pitch, that is, if it is included in the non-drivable sound range, the control signal generation unit 709 generates a control signal (second control signal as signal) based on the note event data including the pitch data converted by the pitch data conversion unit 707. The control signal generation unit 709 transmits the generated control signal to the key driving device 10, or the pedal driving device, which is not shown.

The control signal transmitted from the control signal generation unit 709 to the key driving device 10 is supplied to the PWM generator 102 and converted into a PWM-type excitation current and supplied to the corresponding solenoid 101. In the present embodiment, the case in which the current signal that is supplied to the solenoid 101 is a PWM-type signal has been described, but the format of the current signal is not limited to the PWM format.

The series of processes of the automatic performance function 60 performed by the electronic controller 11 described above may be performed sequentially as the event data are read out, or may be performed collectively after all of the event data of the musical piece to be reproduced have been read out.

An example was described above in which, when the pitch data conversion unit 707 changes the note number of the pitch data, the note number is changed such that the pitch increases or decreases by one octave, but the changing of the pitch is not limited thereto. The pitch data conversion unit 707 may change the note number such that the pitch increases or decreases by several octaves. In addition, the pitch data conversion unit 707 may change the note number such that the pitch increases or decreases by 5 degrees, for example.

As described above, in the present embodiment, in the first sound-generating process, the electronic controller 11 generates, based on the first pitch, the control signal (first control signal) to control the keyboard driver to drive a key corresponding to the first pitch (S650; YES, and S670), and the keyboard driver 10 drives the key corresponding to the first pitch based on the control signal output from the electronic controller 11. In the second sound-generating process, the electronic controller 11 generates the control signal (second control signal as the signal) to control the keyboard driver 10 to drive a key corresponding to a pitch that is different from the second pitch (S650; NO, S660, and S670), and the keyboard driver 10 drives the key corresponding to the pitch that is different from the second pitch based on the control signal output from the electronic controller 11. Accordingly, if the pitch of a key that cannot be driven by a solenoid is included in the musical piece that is reproduced by the automatic performance function 60 by means of the keyboard device 1, the pitch is changed to the pitch of a key that can be driven by a solenoid. As a result, even if the pitch of a key that cannot be driven by a solenoid is included in the musical piece that is reproduced, it becomes possible to generate a sound with the keyboard device 1, and thus to realize a higher quality automatic performance.

Second Embodiment

The automatic performance of a second embodiment will now be described. The automatic performance function according to the present embodiment can be realized by the keyboard device 1 according to the first embodiment described with reference to FIGS. 1 to 5. Therefore, a detailed description of the keyboard device and the key driving device that execute the automatic performance function according to the present embodiment will be omitted.

Figure 8:
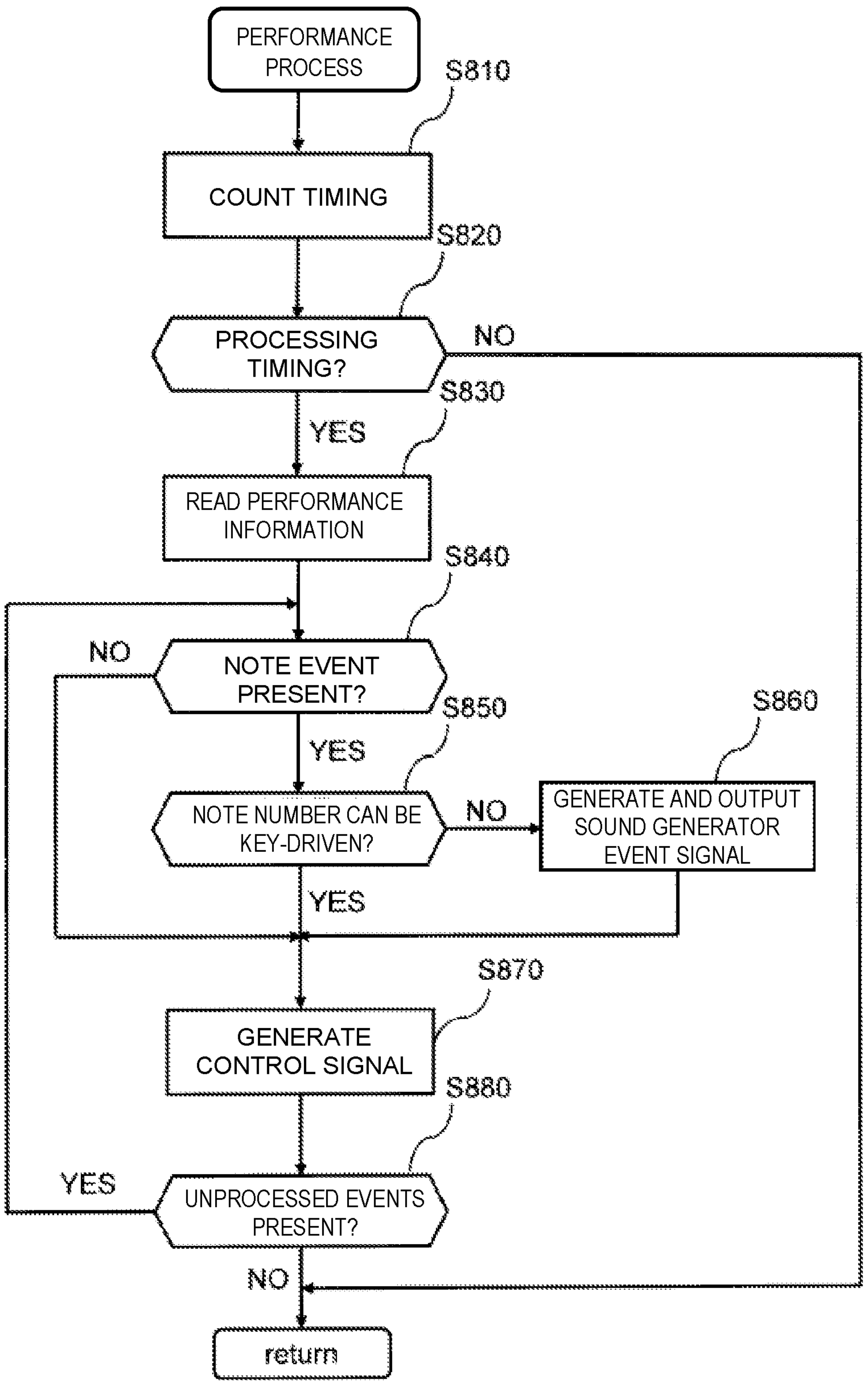
FIG. 8 is a flowchart illustrating the process of an automatic performance function according to a second embodiment that is executed by the electronic controller.

FIG. 8 is a flowchart showing a process that is executed by the electronic controller 11. The process of an automatic performance function 80 that is executed by the electronic controller 11 will be described with reference to FIG. 8. The electronic controller 11 executes a performance process based on instruction information that is input by the user via the operating unit 16 of the keyboard device 1, or the like. The instruction information includes musical piece designation information for designating the musical piece to be reproduced and reproduction information for instructing the execution of the performance process. The instruction information may be in the MIDI format. When the performance process is operated, the reading out of event data corresponding to the musical piece designation information from the storage device 12 is started, and the counting of timing data including step time and gate time (subtraction process of the timing data) is carried out (S810). Then, it is determined whether the timing data being read out have reached a processing timing for processing the event (S820). If the processing timing has not been reached (S820; NO), the electronic controller 11 continues to determine whether the timing data being read out have reached the processing timing.

If it is determined that the timing data have reached the processing timing (S820; YES), the corresponding event data (performance information) are read from the storage device 12 (S830). It is then determined whether the event data that have been read out include note event data (S840).

If the event data do not include the note event data (S840; NO), a control signal is generated based on the event data (S870). On the other hand, if the event data include the note event data (S840; YES), it is determined whether the note number of the pitch data included in the note event data is included in the drivable sound range or the non-drivable sound range (S850).

If the note number of the pitch data included in the note event data is a first pitch, that is, if it is included in the drivable sound range (S850; YES), a control signal for driving the solenoid 101 of the key driving device 10 is generated based on the note event data (S870). On the other hand, if the note number of the pitch data included in the note event data is a second pitch, that is, if it is included in the non-drivable sound range (S850; NO), a sound generator event signal, which includes a waveform readout signal for reading waveform data representing a string-striking sound corresponding to the pitch data, timing data representing the sound generating timing for the sound corresponding to the pitch data, velocity data for controlling the volume, etc., of the sound, and gate time data representing the key-on time of the sound, is generated (S860). In addition, a sound generator event generation signal, which indicates that a sound generator event signal has been generated, may be generated.

As described above, if the note number of the pitch data is a first pitch, that is, if it is included in the drivable sound range, a control signal for driving the solenoid 101 of the key driving device 10 is generated based on the note event data (S870). It is determined whether an unprocessed event is included in the event data that have been read out (S880), and if an unprocessed event is included (S880; YES), the process returns to Step S840. The process of S840 to S880 is repeated until there are no unprocessed events. When there no longer are any unprocessed events (S880; NO), the electronic controller 11 returns to S810, subtracts the timing data until the next processing timing is reached to determine the next processing timing.

Figure 9:
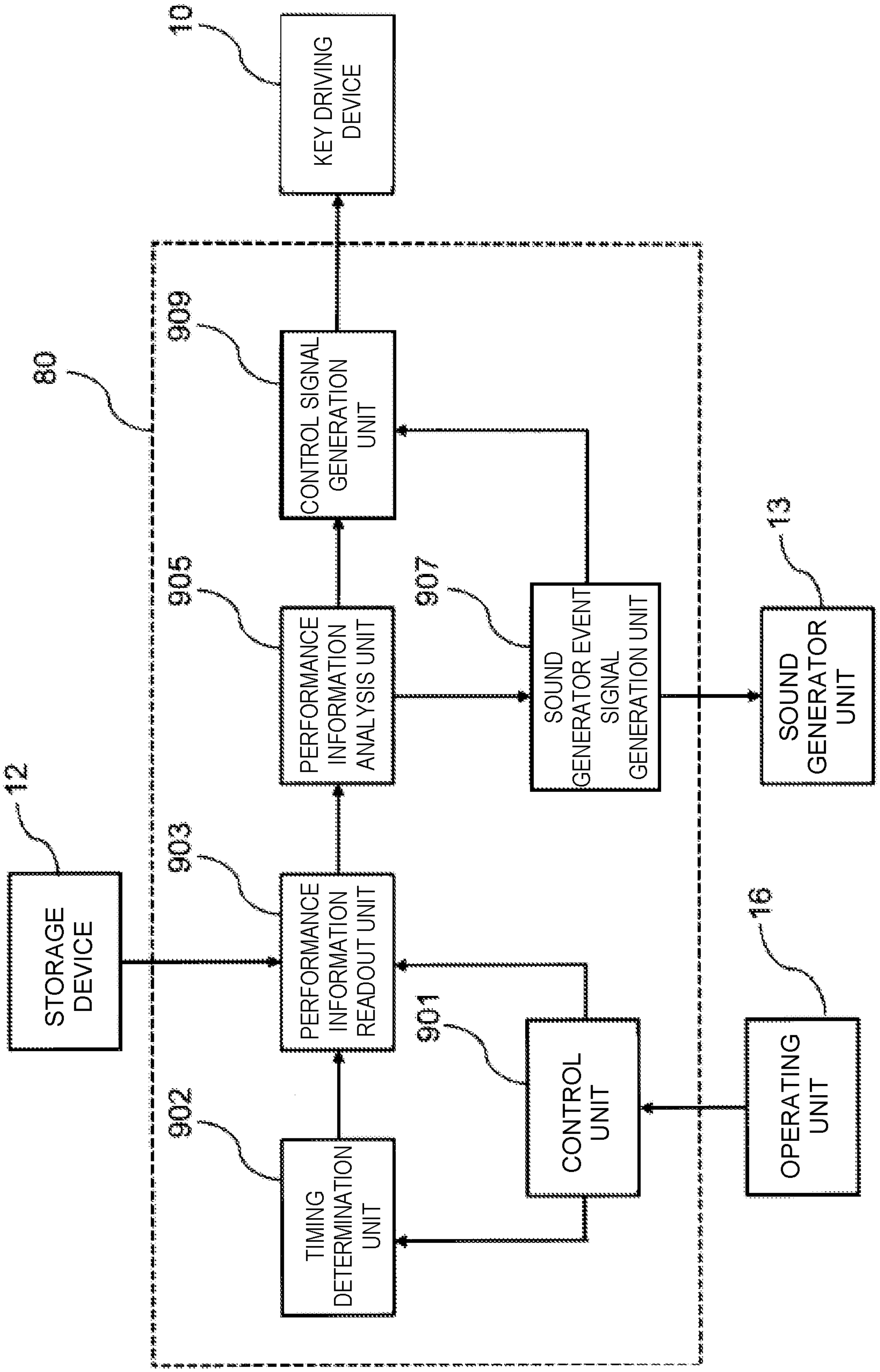
FIG. 9 is a block diagram illustrating the configuration of the automatic performance function according to the second embodiment.

FIG. 9 is a block diagram illustrating the configuration of the automatic performance function 80 according to the present embodiment, and, referring to FIG. 9, the electronic controller 11, which is configured to execute the automatic performance function 80, includes a control unit 901, a timing determination unit 902, a performance information readout unit 903, a performance information analysis unit 905, a sound generator event signal generation unit 907, and a control signal generation unit 909.

The control unit 901 generates performance reproduction information based on the instruction information that is input by the user via the operating unit 16 of the keyboard device 1, or the like, and supplies the generated performance reproduction information to the timing determination unit 902. In addition, based on the instruction information that is input by the user, the control unit 901 supplies the musical piece designation information for designating the musical piece to be read out to the performance information readout unit 903. The instruction information that is input by the user may be information in the MIDI format.

The timing determination unit 902 receives the performance reproduction information, counts the timing data, and determines whether the processing timing for processing the event has been reached. If the processing timing has been reached, the timing determination unit 902 transmits a start signal for starting the readout of the performance information (event data) to the performance information readout unit 903.

When the start signal is received, based on the musical piece designation information, the performance information readout unit 903 reads event data corresponding to the processing timing from the storage device 12. The performance information readout unit 903 transmits the event data that have been read to the performance information analysis unit 905.

The performance information analysis unit 905 analyzes event data received from the performance information readout unit 903. The performance information analysis unit 905 determines whether the received event data include note event data. If the received event data do not include the note event data, the performance information analysis unit 905 transmits the event data to the control signal generation unit 909.

If the received event data include the note event data, the performance information analysis unit 905 determines whether the note number of the pitch data included in the note event data is a first pitch, that is, whether it is included in the drivable sound range, or a second pitch, that is, whether it is included in the non-drivable sound range. As described in the first embodiment, a first pitch is a pitch of a key for which a corresponding solenoid is provided, and a second pitch is a pitch of a key for which a corresponding solenoid is not provided.

If the note number of the pitch data is a first pitch, that is, if it is in the drivable sound range, the performance information analysis unit 905 transmits the note event data to the control signal generation unit 909 as is. On the other hand, if the note number of the note event data is a second pitch, that is, if it is included in the non-drivable sound range, the performance information analysis unit 905 transmits the note event data to the sound generator event signal generation unit 907.

The sound generator event signal generation unit 907 generates and transmits to the sound generator unit 13 a sound generator event signal, which includes a waveform readout signal for reading waveform data representing a string-striking sound corresponding to the pitch data whose note number is a second pitch, timing data representing the sound generating timing for the sound corresponding to the pitch data, velocity data for controlling the volume, etc., of the sound, and gate time data representing the key-on time of the sound. In addition, the sound generator event signal generation unit 907 transmits a sound generator event generation signal, which indicates that a sound generator event signal has been generated, to the control signal generation unit 909.

The control signal generation unit 909 generates a control signal based on the received event data. The control signal can be of various types for automatically performing the musical piece. For example, the control signal includes a control signal for driving the solenoids 101 of the key driving device 10, a control signal for driving the pedal driving device, which is not shown, and the like. If the note number of the pitch data included in the original note event data is a first pitch, that is, if it is included in the drivable sound range, the control signal generation unit 909 generates a control signal for driving the solenoid 101 of the key driving device 10 based on the original note event data. The control signal generation unit 909 does not generate a control signal corresponding to note event data for which the sound generator event signal generation unit 907 generated a sound generator event signal. The control signal generation unit 909 transmits the generated control signal to the key driving device 10.

When the sound generator event signal is received from the sound generator event signal generation unit 907, the sound generator unit 13 reads waveform data from the storage device 12 based on the sound generator event signal and gate time data, amplifies the waveform data that have been read out based on the velocity data, and outputs the amplified waveform data to the speaker 14 based on the timing data.

The series of processes of the automatic performance function 80 carried out by the electronic controller 11 described above may be carried out sequentially as the event data are read out or carried collectively after all of the event data of the musical piece to be reproduced have been read out. If processing is carried out collectively after all of the event data of the musical piece have been read out, and pitch data of a second pitch is included in the note event data included in the event data, the sound generator event signal generation unit 907 may flag the pitch data for which a sound generator event signal has been generated indicating that the sound generator event signal has been generated. The sound generator event signal generation unit 907 transmits the event data including the flagged pitch data to the control signal generation unit 909. It is not necessary for the control signal generation unit 909 to generate a control signal corresponding to the flagged pitch data.

As described above, in the present embodiment, in the first sound-generating process, the electronic controller 11 generates, based on the first pitch, the control signal (first control signal) to control the keyboard driver to drive a key corresponding to the first pitch (S850; YES, and S870), and the keyboard driver 10 drives the key corresponding to the first pitch based on the control signal output from the electronic controller 11. In the second sound-generating process, the electronic controller 11 generates the sound generator event signal as the signal to cause the sound generator of the sound generator unit 13 to generate the sound signal corresponding to the second pitch (S850; NO, and S860), the sound generator generates the sound signal corresponding to the second pitch based on the sound generator event signal, and the sound generator unit 13 outputs the sound signal to the speaker 14 such that the speaker 14 generates the sound. Accordingly, if the pitch of a key that cannot be driven by a solenoid is included in the musical piece that is automatically performed by the keyboard device 1, waveform data corresponding to the pitch are read out from the storage device 12 and output from the sound generator unit 13. The waveform data output from the sound generator unit 13 are sounded as an electronic sound from the speaker 14. As a result, even if the pitch of a key that cannot be driven by a solenoid is included in the musical piece that is automatically performed, it becomes possible to generate a sound with the keyboard device 1, and thus to realize a higher quality automatic performance.

Third Embodiment

If the pitch of a key that cannot be driven by a solenoid is included in the musical piece that is automatically performed by the keyboard device 1, the pitch is changed to the pitch of a key that can be driven by a solenoid in the first embodiment, and waveform data corresponding to the pitch is read out and sounded as an electronic sound in the second embodiment. On the other hand, if the pitch of a key that cannot be driven by a solenoid is changed to the pitch of a key that can be driven by a solenoid, as in the first embodiment, the user may recognize that a sound that is different from the actual sound of the musical piece is being generated, depending on the changed pitch. In particular, when a pitch in the high-pitch range is shifted to the low-pitch side, there is the risk that the user will recognize that the generated sound is different from the actual sound of the musical piece. In such a case, it is possible to achieve a higher-quality automatic performance by executing the first embodiment and the second embodiment in combination.

An automatic performance function of a third embodiment, which is a combination of the first embodiment and the second embodiment, will be described below. The automatic performance function according to the present embodiment can be realized by the keyboard device 1 according to the first embodiment described with reference to FIGS. 1 to 5. Therefore, a detailed description of the keyboard device and the key driving device that execute the automatic performance function according to the present embodiment will be omitted.

Figure 10:
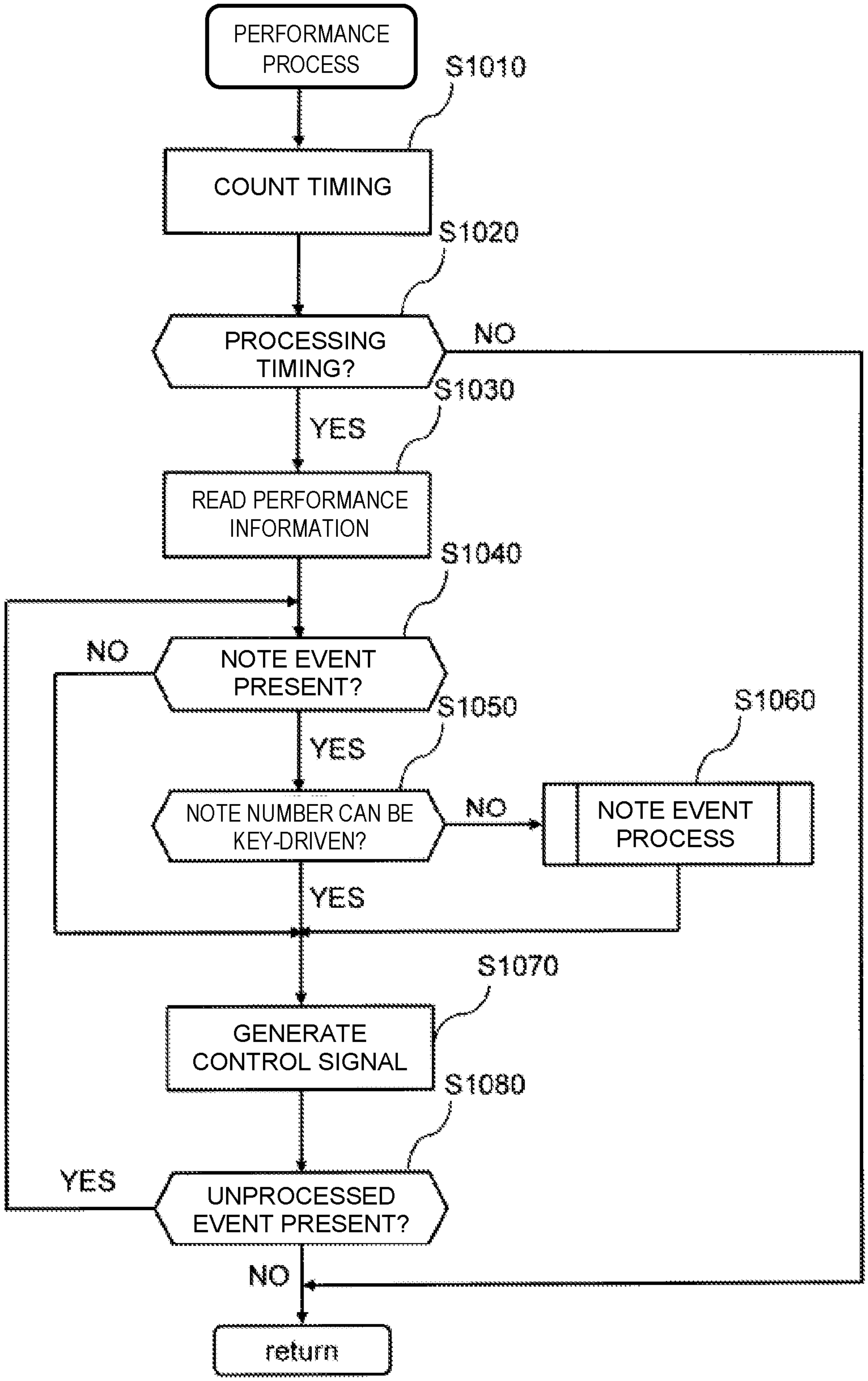
FIG. 10 is a flowchart illustrating the process of an automatic performance function according to a third embodiment that is executed by the electronic controller.
Figure 11:
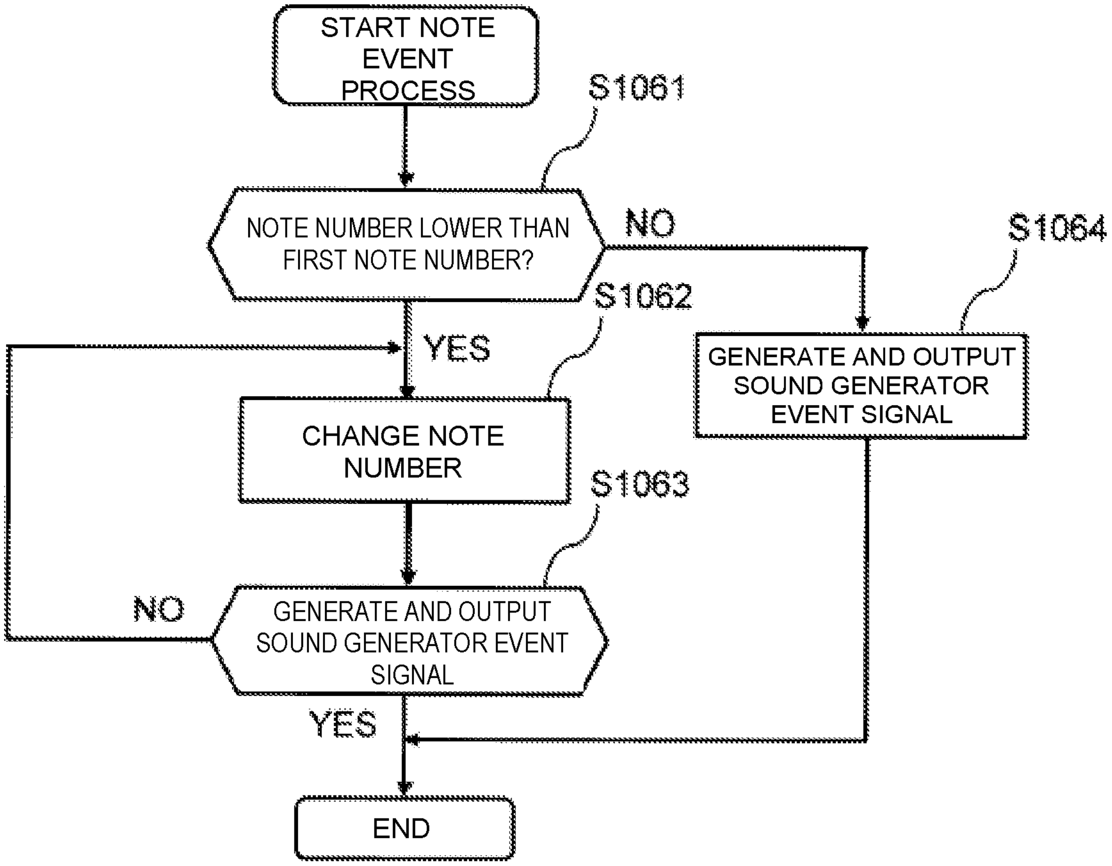
FIG. 11 is the flowchart illustrating the process of the automatic performance function according to the third embodiment that is executed by the electronic controller.

FIGS. 10 and 11 are flowcharts showing a process that is executed by the electronic controller 11. The process of an automatic performance function 1000 that is executed by the electronic controller 11 will be described with reference to FIGS. 10 and 11. The electronic controller 11 executes a performance process based on instruction information that is input by the user via the operating unit 16 of the keyboard device 1, or the like. The instruction information includes musical piece designation information for designating the musical piece to be reproduced, and reproduction information for instructing the execution of the performance process. The instruction information may be in the MIDI format. When the performance process is carried out, the reading out of event data corresponding to the musical piece designation information from the storage device 12 is started, and the counting of timing data including step time and gate time (subtraction process of the timing data) is carried out (S1010). Then, it is determined whether the timing data being read out have reached a processing timing for processing the event (S1020). If the processing timing has not been reached (S1020; NO), the electronic controller 11 continues to determine whether the timing data being read out have reached the processing timing.

If it is determined that the timing data have reached the processing timing (S1020; YES), event data corresponding to the processing timing are read from the storage device 12 (S1030). It is then determined whether the event data that have been read out include note event data (S1040).

If the event data do not include the note event data (S1040; NO), a control signal is generated based on the event data (S1070). On the other hand, if the event data include the note event data (S1040; YES), it is determined whether the note number of the pitch data included in the note event data is included in the drivable sound range or the non-drivable sound range (S1050).

If the note number of the pitch data included in the note event data is a first pitch, that is, if it is included in the drivable sound range (S1050; YES), a control signal for driving the solenoid 101 of the key driving device 10 is generated based on the note event data (S1070). If the note number of the pitch data included in the note event data is a second pitch, that is, if it is included in the non-drivable sound range (S1050; NO), a process corresponding to the note event data is executed (S1060).

If the note number of the pitch data included in the note event data is a second pitch, that is, if it is included in the non-drivable sound range (S1050; NO), it is determined whether the note number of the pitch data is lower than the first note number (S1061). In particular, in S1061, it is essentially determined whether the note number of the pitch data is lower than the first note number or higher than the second note number. Keys corresponding to a second pitch lower than the first note number or higher than the second note number correspond to some of the keys 20 corresponding to the high notes or some of the keys 20 corresponding to the low notes located at the two ends of the keyboard 2 of the keyboard device 1 for which corresponding solenoids are not provided. That is, it is determined whether the note number of the pitch data is on the low note side or the high note side.

If the note number of the pitch data is lower than the first note number, that is, if the note number of the pitch data is on the low note side (S1061; YES), the note number of the pitch data included in the note event data is changed (S1062). It is then determined whether the note number of the converted pitch data is included in the drivable sound range (S1063). If the note number of the converted pitch data is included in the drivable sound range (S1063; YES), a control signal for driving the solenoid 101 of the key driving device 10 is generated based on the note event data including the converted pitch data (S1070). On the other hand, if the note number of the converted pitch data is not included in the drivable sound range (S1063; NO), the changing of the note number (S1062) is repeated until the note number of the converted pitch data is included in the drivable sound range.

On the other hand, if it is determined that the note number of the pitch data is not lower than the first note number (S1061; No), in other words, if the note number of the pitch data is higher than the second note number, that is, if the note number of the pitch data is on the high note side, a sound generator event signal, which includes a waveform readout signal for reading waveform data representing a string-striking sound corresponding to the pitch data, timing data representing the sound generating timing for the sound corresponding to the pitch data, velocity data for controlling the volume, etc., of the sound, and gate time data representing the key-on time of the sound, is generated and output (S1064). In addition, a sound generator event generation signal, which indicates that a sound generator event signal has been generated, may be generated.

As described above, if the note number of the pitch data is a first pitch, that is, if it is included in the drivable sound range, a control signal for driving the solenoid 101 of the key driving device 10 is generated based on the note event data (S1070). It is determined whether an unprocessed event is included in the event data (S1080), and if an unprocessed event is included (S1080; YES), the process returns to Step S1040. The process of S1040 to S1080 is repeated until there are no unprocessed events. When there no longer are any unprocessed events (S1080; NO), the electronic controller 11 returns to S1010, subtracts the timing data until the next processing timing is reached to determine the next processing timing.

Figure 12:
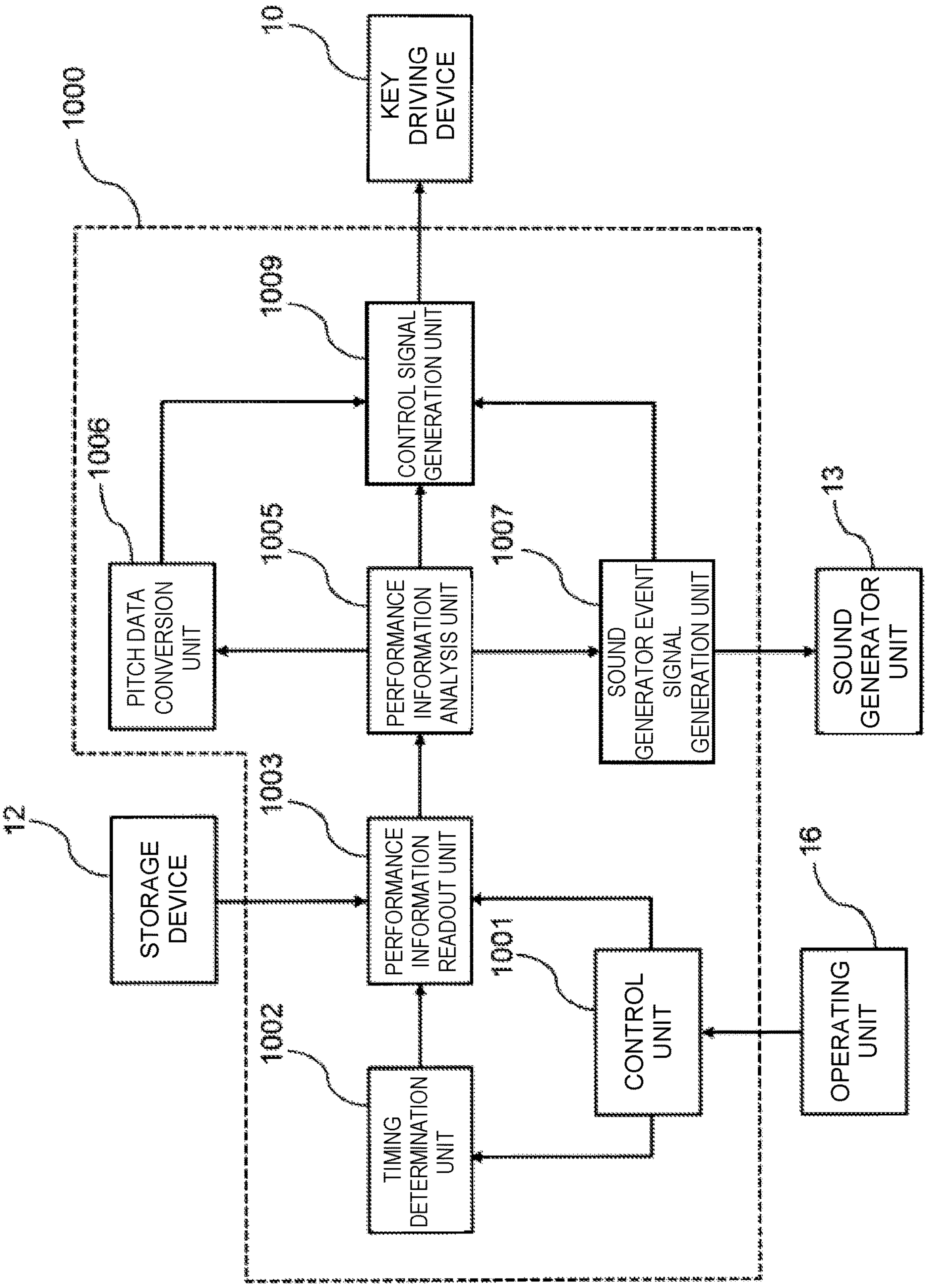
FIG. 12 is a block diagram illustrating the configuration of the automatic performance function according to the third embodiment.

FIG. 12 is a block diagram illustrating the configuration of an automatic performance function 1000 according to the present embodiment. Referring to FIG. 12, the electronic controller 11, which is configured to execute the automatic performance function 1000, includes a control unit 1001, a timing determination unit 1002, a performance information readout unit 1003, a performance information analysis unit 1005, a pitch data conversion unit 1006, a sound generator event signal generation unit 1007, and a control signal generation unit 1009.

The control unit 1001 generates performance reproduction information based on the instruction information that is input by the user via the operating unit 16 of the keyboard device 1, or the like, and supplies the generated performance reproduction information to the timing determination unit 1002. In addition, based on the instruction information that is input by the user, the control unit 1001 supplies the musical piece designation information for designating the musical piece to be read out to the performance information readout unit 1003. The instruction information that is input by the user may be information in the MIDI format.

The timing determination unit 1002 receives the performance reproduction information, counts the timing data, and determines whether the processing timing for processing the event has been reached. If the processing timing has been reached, the timing determination unit 1002 transmits a start signal for starting the reading out of the performance information (event data) to the performance information readout unit 1003.

When the start signal is received, based on the musical piece designation information, the performance information readout unit 1003 reads event data corresponding to the processing timing from the storage device 12. The performance information readout unit 1003 transmits the event data that have been read to the performance information analysis unit 1005.

The performance information analysis unit 1005 analyzes event data received from the performance information readout unit 1003. The performance information analysis unit 1005 determines whether the received event data include note event data. If the event data do not include the note event data, the performance information analysis unit 1005 transmits the event data to the control signal generation unit 1009.

If the received event data include the note event data, the performance information analysis unit 1005 determines whether the note number of the pitch data included in the note event data is a first pitch, that is, whether it is included in the drivable sound range, or a second pitch other than the first pitch, that is, whether it is included in the non-drivable sound range. As described in the first embodiment, a first pitch is a pitch of a key for which a corresponding solenoid is provided, and a second pitch is the pitch of a key for which a corresponding solenoid is not provided.

If the note number of the pitch data is a first pitch, that is, if it is in the drivable sound range, the performance information analysis unit 1005 transmits the note event data to the control signal generation unit 1009 as is. On the other hand, if the note number of the pitch data is a second pitch, that is, if it is in the non-drivable sound range, the performance information analysis unit 1005 determines whether the note number of the pitch data is lower than the first note number or higher than the second note number. Keys corresponding to a second pitch lower than the first note number or higher than the second note number correspond to some of the keys 20 corresponding to the high notes or some of the keys 20 corresponding to the low notes located at the two ends of the keyboard 2 of the keyboard device 1 for which corresponding solenoids are not provided. That is, the performance information analysis unit 1005 determines whether the note number of the pitch data is on the low note side or on the high note side. If the note number of the pitch data is lower than the first note number, that is, if the note number of the pitch data is on the low note side, the performance information analysis unit 1005 transmits the note event data to the pitch data conversion unit 1006. On the other hand, if the note number of the pitch data is higher than the second note number, that is, if the note number of the pitch data is on the high note side, the performance information analysis unit 1005 transmits the note event data to the sound generator event signal generation unit 1007.

The pitch data conversion unit 1006 converts the pitch data that are a second pitch on the low note side. That is, the pitch data conversion unit 1006 converts the pitch of a key for which a corresponding solenoid is not provided to a first pitch that can be automatically performed by means of a solenoid, that is, the pitch of a key for which a corresponding solenoid is provided. For example, the pitch data conversion unit 1006 may convert the note number of the pitch data such that the pitch is increased by one octave. The pitch data conversion unit 1006 transmits the event data including the converted pitch data to the control signal generation unit 1009. The changing of the pitch by the pitch data conversion unit 1006 is not limited thereto. The pitch data conversion unit 1006 may change the note number such that the pitch is increased by several octaves. In addition, the pitch data conversion unit 1006 may change the note number such that the pitch increases by 5 degrees, for example.

The sound generator event signal generation unit 1007 generates and transmits to the sound generator unit 13 a sound generator event signal, which includes a waveform readout signal for reading waveform data that representing a string-striking sound corresponding to the pitch data that are a second pitch on the high note side, timing data representing the sound generating timing for the sound corresponding to the pitch data, velocity data for controlling the volume, etc., of the sound, and gate time data representing the key-on time of the sound. In addition, the sound generator event signal generation unit 1007 transmits a sound generator event generation signal, which indicates that a sound generator event signal has been generated, to the control signal generation unit 1009.

The control signal generation unit 1009 generates a control signal based on the received event data. The control signal can be of various types for automatically performing the musical piece. For example, the control signal includes a control signal for driving the solenoids 101 of the key driving device 10, a control signal for driving the pedal driving device, which is not shown, and the like. If the note number of the pitch data included in the original note event data is a first pitch, that is, if it is included in the drivable sound range, the control signal generation unit 1009 generates a control signal for driving the solenoid 101 of the key driving device 10 based on the original note event data. On the other hand, if the note number of the pitch data is a second pitch on the low note side, the control signal generation unit 1009 generates a control signal based on the note event data including the pitch data converted by the pitch data conversion unit 1006. However, the control signal generation unit 1009 does not generate a corresponding control signal for pitch data generated by the sound generator event signal by means of the sound generator event signal generation unit 1007. The control signal generation unit 1009 transmits the generated control signal to the key driving device 10 or to the pedal driving device, which is not shown.

The operations of the key driving device 10 to which the control signal is supplied and of the sound generator unit 13 to which the sound generator event signal is supplied are the same as those in the above-described first and second embodiments, so that their detailed descriptions are omitted. The series of processes of the automatic performance function 1000 carried out by the electronic controller 11 described above may be carried out sequentially as the event data are read out, or collectively after all of the event data of the musical piece to be reproduced have been read out.

As described above, in the present embodiment, in the first sound-generating process, the electronic controller 11 generates, based on the first pitch, the control signal (first control signal) to control the keyboard driver to drive a key corresponding to the first pitch (S1050; YES, and S1070), and the keyboard driver 10 drives the key corresponding to the first pitch based on the control signal output from the electronic controller 11. In the second sound-generating process, upon receiving the second pitch higher than a pitch range (drivable sound range) in which pitches including the first pitch and corresponding to the keys that the keyboard driver 10 is configured to drive are included, the electronic controller 11 generates the sound generator event signal as the signal to cause the sound generator of the sound generator unit 13 to generate the sound signal corresponding to the second pitch (S1050; NO, S1061; NO, and S1064), the sound generator generates the sound signal corresponding to the second pitch based on the sound generator event signal, and the sound generator unit 13 outputs the sound signal to the speaker 14 such that the speaker 14 generates the sound. In the second sound-generating process, upon receiving the second pitch lower than the pitch range (drivable sound range), the electronic controller 11 generates the second control signal as the signal to control the keyboard driver 10 to drive a key corresponding to a pitch different from the second pitch (S1050; NO, S1061; YES, S1062, and S1070), and the keyboard driver 10 drives the key corresponding to the pitch that is different from the second pitch based on the control signal output from the electronic controller 11. Accordingly, if the pitch of a key that cannot be driven by a solenoid is included in the musical piece automatically performed by the keyboard device 1, the pitch is changed to the pitch of a key that can be driven by a solenoid, or is sounded as an electronic sound. In particular, a high pitch on the high-note side, which would easily be easily recognized by the user if the sound is shifted, is generated as an electronic sound, thereby making it possible to achieve a higher-quality automatic performance.

First Modified Example

In the above-described third embodiment, whether to change to the pitch of a key that can be driven by a solenoid, or to produce it as an electronic sound, is categorized in accordance with the pitch (note number) of the pitch data included in the music data. However, all of the pitches of the keys that cannot be driven by solenoids may be produced as electronic sounds, and other keys that can be driven by solenoids may be driven regardless of the pitch (note number) of the pitch data included in the music data. In this case, a muffling device for blocking the striking of the string by means of a hammer corresponding to each key 20 of the keyboard device 1 is driven.

Second Modified Example

In the second and third embodiments, the keyboard device 1 is configured to comprise the sound generator unit 13 and the speaker 14, but the sound generator and the speaker may be provided outside of the keyboard device 1. That is, if the pitch of a key that cannot be driven by a solenoid is included, the keyboard device 1 may read waveform data corresponding to the pitch from the storage device 12, output the waveform that has been read to an external sound generator, and cause a separately provided speaker to generate a sound.

Fourth Embodiment

In the embodiments and modified examples above, examples were described in which solenoids could not be provided at both end portions of the keyboard of the keyboard device to drive keys. However, there are cases in which the operation of a solenoid is temporarily stopped, such as due to the activation of a safety device because of overheating or due to a malfunction in the key driving device that contains the given solenoid. In such a case, even if a key is provided with a corresponding solenoid, the key cannot be driven by the key driving device. In the fourth embodiment, a keyboard device with which automatic performance is possible even of the operation of a solenoid is stopped will be described.

The automatic performance of the fourth embodiment will be described below. The automatic performance function according to the present embodiment can be realized by the keyboard device 1 according to the first embodiment described with reference to FIGS. 1 to 5. Therefore, a detailed description of the keyboard device and the key driving device that execute the automatic performance function according to the present embodiment will be omitted.

Figure 13:
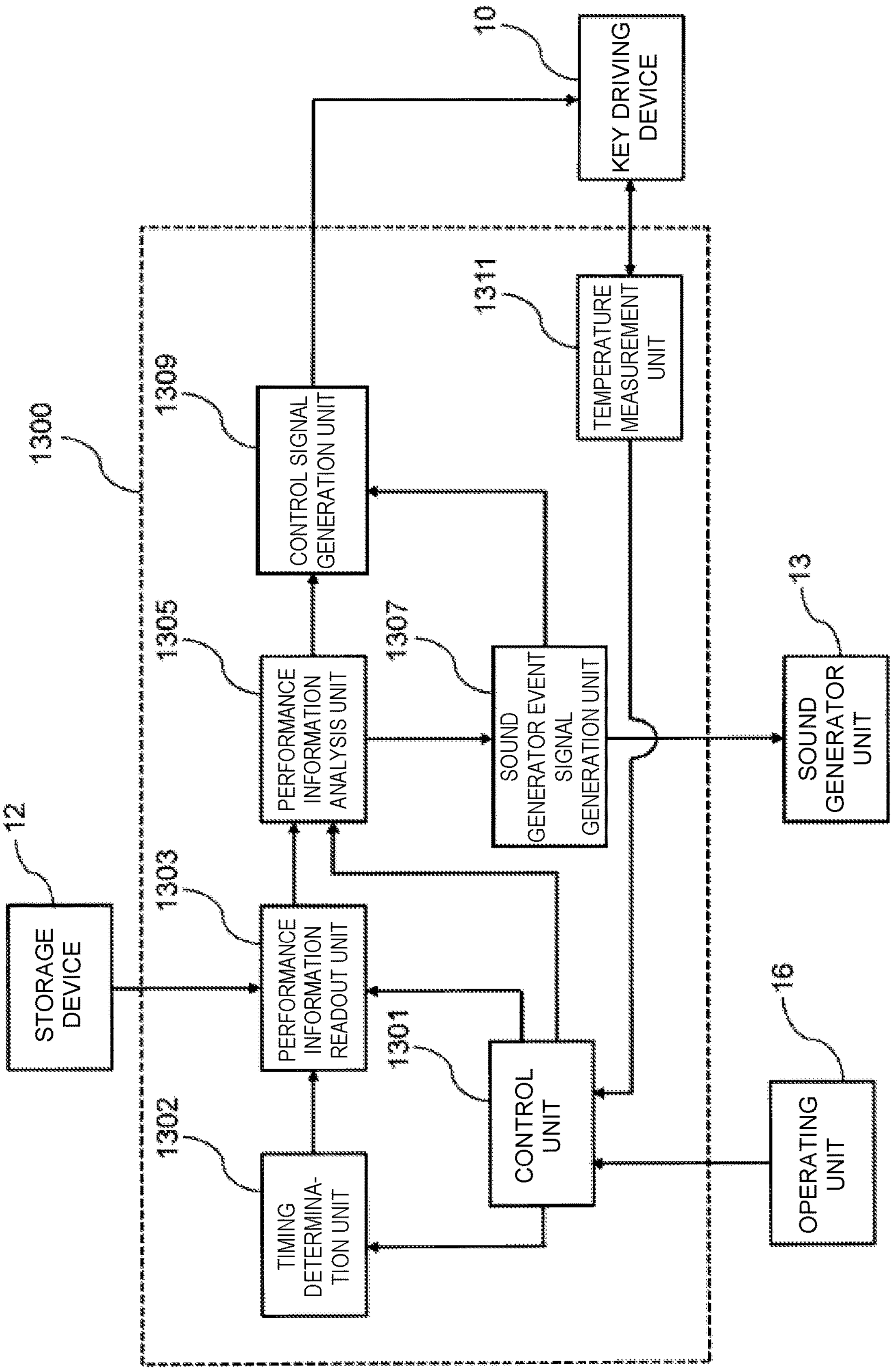
FIG. 13 is a block diagram illustrating the configuration of the automatic performance function according to a fourth embodiment.

FIG. 13 is a block diagram illustrating the configuration of an automatic performance function 1300 according to the present embodiment. Referring to FIG. 13, the electronic controller 11, which is configured to execute the automatic performance function 1300, includes a control unit 1301 a timing determination unit 1302, a performance information readout unit 1303, a performance information analysis unit 1305, a sound generator event signal generation unit 1307, a control signal generation unit 1309, and a temperature measurement unit 1311.

The temperature measurement unit 1311 measures the temperature of the key driving device 10. Specifically, the temperature measurement unit 1311 measures the change in temperature of the solenoid 101 of the key driving device 10. For example, a resistance method that uses the temperature coefficient of the resistance of copper may be employed to measure the temperature rise of the coil. When the coil heats up and the temperature inside the solenoid 101 increases, there is the risk that the solenoid will ignite and start to smoke. Therefore, if the temperature rise of the coil exceeds a prescribed threshold value, the temperature measurement unit 1311 supplies a stop signal to the key driving device 10 for stopping the operation of the corresponding solenoid 101. In addition, the temperature measurement unit 1311 supplies a signal to the control unit 1301 which indicates that the stop signal has been supplied to the key driving device 10, and information (for example, note number) indicating the pitch of the key corresponding to the stopped solenoid 101. The temperature measurement unit 1311 may use a thermometer to measure the change in temperature of the solenoid 101.

The control unit 1301 generates performance reproduction information based on instruction information that is input by the user via the operating unit 16 of the keyboard device 1, or the like, and supplies the generated performance reproduction information to the timing determination unit 1302. In addition, based on the instruction information that is input by the user, the control unit 1301 supplies musical piece designation information to the performance information readout unit 1303 for designating the musical piece to be read out to the performance information readout unit 1303. The instruction information that is input by the user may be information in the MIDI format. In addition, the control unit 1301 acquires a signal indicating that a stop signal has been supplied from the temperature measurement unit 1311 to the key driving device 10, and supplies a signal to the performance information analysis unit 1305 to instruct the sound generator event signal generation unit 1307 to transmit the note event data including the pitch data corresponding to the note number of the key corresponding to the stopped solenoid 101.

The timing determination unit 1302 receives the performance reproduction information, counts the timing data, and determines whether the processing timing for processing the event has been reached. If the processing timing has been reached, the timing determination unit 1302 transmits a start signal for starting the reading out of the performance information (event data) to the performance information readout unit 1303.

When the start signal is received, based on the musical piece designation information, the performance information readout unit 1303 reads event data corresponding to the processing timing from the storage device 12. The performance information readout unit 1303 transmits the event data that have been read to the performance information analysis unit 1305.

The performance information analysis unit 1305 analyzes event data received from the performance information readout unit 1303. The performance information analysis unit 1305 determines whether the received event data include note event data. If the received event data do not include the note event data, the performance information analysis unit 1305 transmits the event data to the control signal generation unit 1309. On the other hand, if the received event data include the note event data, the performance information analysis unit 1305 determines whether the note number of the pitch data included in the note event data is non-drivable sound (second pitch), which has a pitch corresponding to the note number of the solenoid 101 whose operation is stopped, or a drivable sound (first pitch), which has a pitch corresponding to the note number of the solenoid 101 that can be operated. The performance information analysis unit 1305 transmits the note event data including the pitch data that are non-drivable sounds to the sound generator event signal generation unit 1307, and transmits the note event data including the pitch data that are drivable sounds to the control signal generation unit 1309.

The sound generator event signal generation unit 1307 generates and transmits to the sound generator unit 13 a sound generator event signal, which includes a waveform readout signal for reading waveform data representing a string-striking sound corresponding to the pitch data of the received note event data, timing data representing the sound generating timing for the sound corresponding to the pitch data, velocity data for controlling the volume, etc., of the sound, and gate time data representing the key-on time of the sound. In addition, the sound generator event signal generation unit 1307 transmits a sound generator event generation signal, which indicates that a sound generator event signal has been generated, to the control signal generation unit 1309.

The control signal generation unit 1309 generates a control signal based on the received event data. The control signal can be of various types for automatically performing the musical piece. For example, the control signal includes a control signal for driving the pedal driving device, which is not shown, and the like. If the note number of the pitch data included in the original note event data is a first pitch, that is, if it is a drivable sound, the control signal generation unit 1309 generates a control signal for driving the solenoid 101 of the key driving device 10 based on the original note event data. The control signal generation unit 1309 does not generate a control signal corresponding to note event data for which the sound generator event signal generation unit 1307 generated a sound generator event signal. The control signal generation unit 1309 transmits the generated control signal to the key driving device 10.

When the sound generator event signal is received from the sound generator event signal generation unit 1307, the sound generator unit 13 reads waveform data from the storage device 12 based on the sound generator event signal and gate time data, amplifies the waveform data that have been read out based on the velocity data, and outputs the amplified waveform data to the speaker 14 based on the timing data.

When the temperature of the solenoid 101 of the key driving device 10 is measured, and the temperature of the solenoid 101 whose operation has been stopped decreases so that it becomes possible to operate the solenoid 101 safely, the temperature measurement unit 1311 may supply a stop cancellation signal to the key driving device 10 for canceling the suspension of the operation of the solenoid 101 whose temperature has decreased. In addition, the temperature measurement unit 1311 may supply a signal to the control unit 1301 which indicates that the stop cancellation signal has been supplied to the key driving device 10.

The control unit 1301 receives a signal indicating that the stop cancellation signal has been supplied from the temperature measurement unit 1311 to the key driving device 10, and supplies to the performance information analysis unit 1305 the note number of the key corresponding to the solenoid 101 whose suspension of operation has been canceled. In response, when the pitch data included in the note event data is determined, the performance information analysis unit 1305 will determine the pitch corresponding to the note number of the key corresponding to the solenoid 101 whose suspension of operation has been canceled as a drivable sound (first pitch).

Except for the fact that a sound generator event signal is generated with respect to the note event data including the note number corresponding to the pitch of the key corresponding to the solenoid 101 whose operation has been stopped, the process flow executed by the electronic controller 11 is the same as that of the above-described second embodiment.

Figure 14:
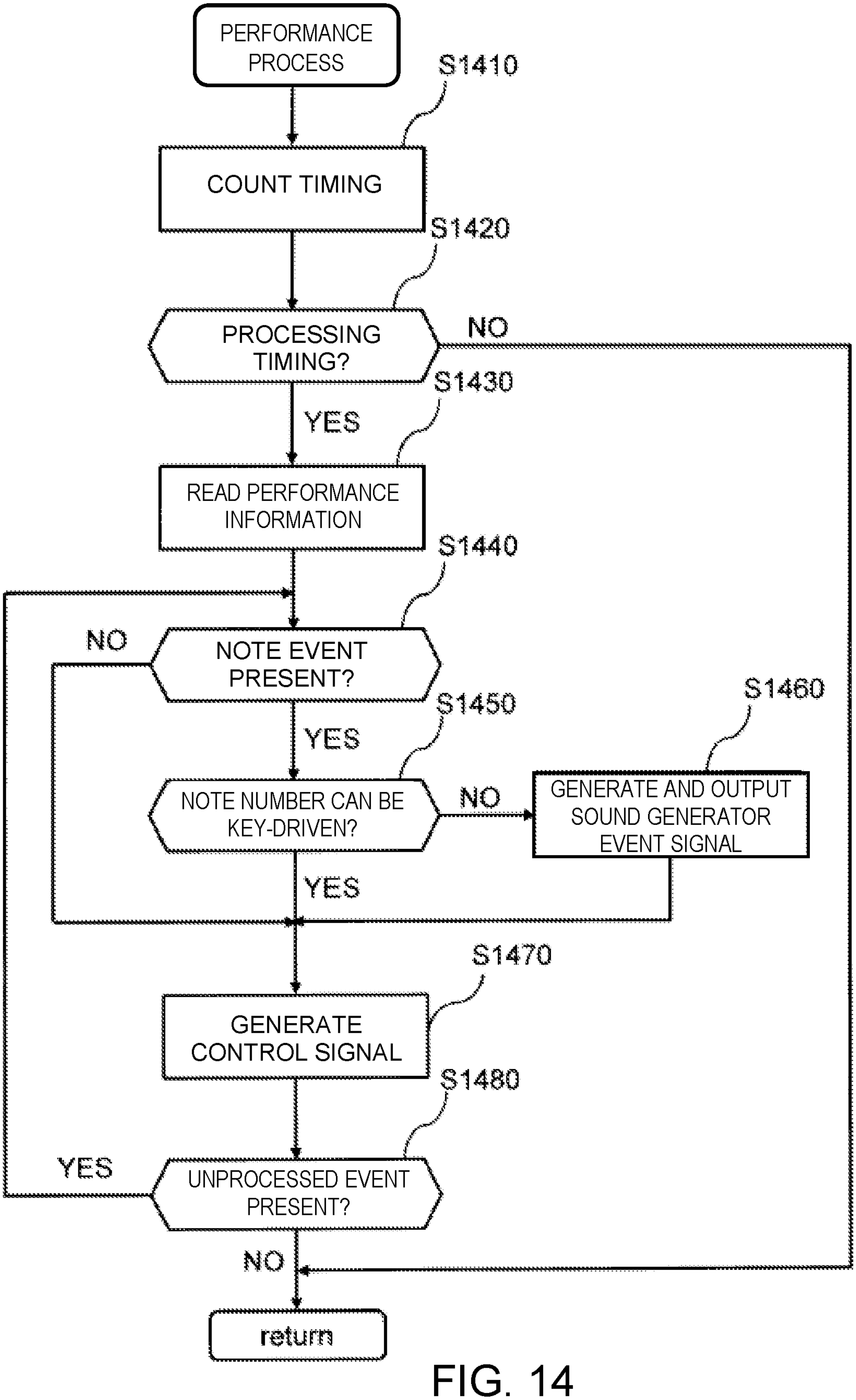
FIG. 14 is a flowchart illustrating the process of an automatic performance function according to the fourth embodiment that is executed by the electronic controller.

FIG. 14 is a flowchart showing the process flow of the present embodiment that is executed by the electronic controller 11. The process flow of the automatic performance function 1300 that is executed by the electronic controller 11 will be described with reference to FIG. 14.

The electronic controller 11 executes a performance process based on instruction information that is input by the user via the operating unit 16 of the keyboard device 1, or the like. Since the steps from counting the timing data (subtraction process of the timing data) (S1410) to the determination of whether the note event data are included in the event data (S1440) are the same as the process Steps S810 to S840 of the automatic performance function 800 described in the second embodiment, a detailed description will be omitted.

If the event data do not include the note event data (S1440; NO), a control signal is generated based on the event data (S1470). On the other hand, if the event data include the note event data (S1440; YES), it is determined whether the note number of the pitch data included in the note event data is a drivable sound (first pitch) or a non-drivable sound (second pitch) (S1450) Here, a drivable sound is a sound corresponding to the note number of the solenoid 101 that can be operated, and a non-drivable sound is a sound corresponding to the note number of the solenoid 101 whose operation has been stopped.

If the note number of the pitch data included in the note event data is a first pitch, that is, if it is a drivable sound (S1450; YES), a control signal for driving the solenoid 101 of the key driving device 10 is generated based on the note event data (S1470). On the other hand, if the note number of the pitch data included in the note event data is a second pitch, that is, if it is a non-drivable sound (S1450; NO), a sound generator event signal, which includes a waveform readout signal for reading waveform data representing a string-striking sound corresponding to the pitch data, timing data representing the sound generating timing for the sound corresponding to the pitch data, velocity data for controlling the volume, etc., of the sound, and gate timing data representing the key-on time of the sound, is generated (S1460). In addition, a sound generator event generation signal, which indicates that a sound generator event signal has been generated, may be generated.

Then, it is determined whether any unprocessed events are included in the event data that have been read out (S1480), and if an unprocessed event is included (S1480; YES), the process returns to Step S1440. When there no longer are any unprocessed events (S1480; NO), the electronic controller 11 returns to S1410, subtracts the timing data until the next processing timing is reached to determine the next processing timing.

In the present embodiment, the case in which a sound generator event signal is generated for some note event data has been described, but the present embodiment is not limited thereto. For example, when a failure occurs in some of the solenoids 101 of the key driving device 10, not only is the operation of the solenoids 101 in which the failure has occurred stopped, but also the operation of the entire key driving device 10.

In this case, the control unit 1301 supplies a signal for instructing the performance information analysis unit 1305 to transmit all of the note event data to the sound generator event signal generation unit 1307. In response, the performance information analysis unit 1305 transmits all of the note event data to the sound generator event signal generation unit 1307, and the sound generator event signal generation unit 1307 generates a sound generator event signal based on the received note event data.

As described above, in the present embodiment, in the first sound-generating process, the electronic controller 11 generates, based on the first pitch, the control signal (first control signal) to control the keyboard driver to drive a key corresponding to the first pitch (S1450; YES, and S1470), and the keyboard driver 10 drives the key corresponding to the first pitch based on the control signal output from the electronic controller 11. In the second sound-generating process, the electronic controller 11 generates the sound generator event signal as the signal to cause the sound generator of the sound generator unit 13 to generate the sound signal corresponding to the second pitch (S1450; NO, and S1460), the sound generator generates the sound signal corresponding to the second pitch based on the sound generator event signal, and the sound generator unit 13 outputs the sound signal to the speaker 14 such that the speaker 14 generates the sound. Accordingly, even if a failure occurs in the key driving device 10 and the operation of the key driving device 10 is stopped, waveform data corresponding to the note event data are read out from the storage device 12 and output from the sound generator unit 13. The waveform data output from the sound generator unit 13 are produced as an electronic sound from the speaker 14. As a result, even if the operation of the solenoids 101 is stopped, it becomes possible to generate a sound with the keyboard device 1, and thus to realize a higher quality automatic performance.

Examples in which various embodiments and modified examples are implemented in a common grand piano type keyboard device was described above, but this disclosure is not limited thereto, and may be realized in an upright piano or a key-driven electronic piano. In addition, this disclosure is not limited to a piano, but may be realized in a celesta or a glockenspiel.

Furthermore, in each of the embodiments and modified examples described above, an example in which keys of a keyboard of a keyboard device cannot be driven by solenoids is described; however, each of the embodiments and modified examples described above can be applied to the automatic performance of music data, which include note event data that correspond to sounds outside of the sonic range that can be produced by means of the keys, in a device in which all of the keys can be driven by solenoids.

Furthermore, in each of the embodiments and modified examples described above, the process of the automatic performance function is executed by the keyboard device. However, the process of the automatic performance function may be carried out by a device other than the keyboard device. For example, when an automatic performance is carried out with a keyboard device, a data conversion device separate from the keyboard device may download the performance information of the musical piece that is reproduced by means of the automatic performance, execute a process of the automatic performance function described above based on the acquired performance information, and supply the various generated control signals to the keyboard device.

Additional Statement

According to one aspect of the embodiment, a keyboard device comprises a plurality of keys, and a keyboard driver configured to drive at least a part of the plurality of keys. The keyboard device is configured such that sound is generated based on a first sound-generating process in which the keyboard driver is configured to drive a first key corresponding to a first pitch, upon receiving performance data including the first pitch and upon determining that the first key corresponding to the first pitch is drivable by the keyboard driver, The keyboard device is configured such that sound is generated based on a second sound-generating process that is different from the first sound-generating process, upon receiving performance data including a second pitch that is different from the first pitch and upon determining that a second key corresponding to the second pitch is not drivable by the keyboard driver.

In the second sound-generating process, the keyboard driver is configured to drive a key corresponding to a pitch that is different from the second pitch.

The keyboard device further comprises a sound generator configured to generate a sound signal corresponding to the second pitch in the second sound-generating process.

The keyboard device further comprises a sound generator configured to generate a sound signal. In the second sound-generating process, the keyboard driver is configured to drive a key corresponding to a pitch different from the second pitch, and the sound generator is configured to generate the sound signal corresponding to the second pitch.

In the second sound-generating process, when the second pitch is higher than a pitch range, the keyboard device is configured such that a sound signal corresponding to the second pitch is generated. The pitch range is a range in which pitches, which include the first pitch and correspond to drivable keys that are drivable by the keyboard driver, are included. When the second pitch is lower than the pitch range, the keyboard driver is configured to drive a key corresponding to a pitch different from the second pitch.

The keyboard device further comprises an electronic controller including at least one processor. The electronic controller is configured to generate, based on the first pitch, a first control signal to control the keyboard driver to drive the first key corresponding to the first pitch, upon receiving the performance data including the first pitch and determining that the first key corresponding to the first pitch is drivable by the keyboard driver, in the first sound-generating process, and generate a different signal that is different from the first control signal, upon receiving the performance data including the second pitch and determining that the second key corresponding to the second pitch is not drivable by the keyboard driver, in the second sound-generating process.

In the second sound-generating process, the electronic controller is configured to generate, as the different signal, a second control signal to control the keyboard driver to drive a drivable key which is drivable by the keyboard driver and is different from the second key corresponding to the second pitch.

The keyboard device further comprises a sound generator configured to generate a sound signal. In the second sound-generating process, the electronic controller is configured to generate, as the different signal, a sound generator event signal to cause the sound generator to generate the sound signal which corresponds to the second pitch.

The keyboard device further comprises a sound generator configured to generate a sound signal. In the second sound-generating process, upon receiving the performance data including the second pitch higher than a pitch range, and upon determining that the second key corresponding to the second pitch is not drivable by the keyboard driver, the electronic controller is configured to generate, as the different signal, a sound generator event signal to cause the sound generator to generate the sound signal which corresponds to the second pitch. The pitch range is a range in which pitches, which include the first pitch and correspond to drivable keys that are drivable by the keyboard driver, are included. In the second sound-generating process, upon receiving the performance data including the second pitch lower than the pitch range, and upon determining that the second key corresponding to the second pitch is not drivable by the keyboard driver, the electronic controller is configured to generate, as the different signal, a second control signal to control the keyboard driver to drive a drivable key which is drivable by the keyboard driver and is different from the second key corresponding to the second pitch.

According to another aspect of the embodiment, a sound generation control method comprises receiving performance data, generating sound based on a first sound-generating process by driving a first key corresponding to a first pitch, upon receiving the performance data including the first pitch and upon determining that the first key corresponding to the first pitch is drivable by a keyboard driver, and generating sound based on a second sound-generating process that is different from the first sound-generating process, upon receiving the performance data including a second pitch that is different from the first pitch and upon determining that a second key corresponding to the second pitch is not drivable by the keyboard driver.

According to another aspect of the embodiment, a non-transitory computer readable medium, which stores a program causing a computer to execute a process, comprises receiving performance data, generating sound based on a first sound-generating process by driving a first key corresponding to a first pitch, upon receiving the performance data including the first pitch and upon determining that the first key corresponding to the first pitch is drivable by a keyboard driver, and generating sound based on a second sound-generating process that is different from the first sound-generating process, upon receiving the performance data including a second pitch that is different from the first pitch and upon determining that a second key corresponding to the second pitch is not drivable by the keyboard driver.

What is claimed is:

1. A keyboard device comprising:

a plurality of keys;

a keyboard driver configured to drive at least a part of the plurality of keys;

a computer storage storing event data; and an electronic controller that includes at least one processor and is configured to read out the event data from the computer storage, the keyboard device being configured such that when a key corresponding to a pitch of the event data read out from the computer storage is drivable by the keyboard driver, sound is generated based on a first sound-generating process in which the keyboard driver is configured to drive the key corresponding to the pitch of the event data read out from the computer storage, and when the key corresponding to the pitch of the event data read out from the computer storage is not drivable by the keyboard driver, sound is generated based on a second sound-generating process in which the keyboard driver is configured to drive a different key corresponding to a different pitch that is different from the pitch of the event data read out from the computer storage.

2. The keyboard device according to claim 1, further comprising a sound generator configured to generate a sound signal corresponding to the pitch of the event data read out from the computer storage in the second sound-generating process.

3. The keyboard device according to claim 1, further comprising a sound generator configured to generate a sound signal corresponding to the pitch of the event data read out from the computer storage, wherein in the second sound-generating process, the keyboard driver is configured to drive the different key corresponding to the different pitch, and the sound generator is configured to generate the sound signal corresponding to the pitch of the event data read out from the computer storage.

4. The keyboard device according to claim 1, wherein in the second sound-generating process, the keyboard driver is configured to drive the key corresponding to the different pitch when the pitch of the event data read out from the computer storage is lower than a pitch range, the pitch range being a range in which pitches, which correspond to drivable keys that are drivable by the keyboard driver, are included, and when the pitch of the event data read out from the computer storage is higher than the pitch range, the keyboard device is configured such that a sound signal corresponding to the pitch of the event data read out from the computer storage is generated.

5. The keyboard device according to claim 1, wherein the electronic controller is further configured to generate a first control signal to control the keyboard driver to drive the key corresponding to the pitch of the event data read out from the computer storage in the first sound-generating process, and generate a different signal that is different from the first control signal in the second sound-generating process.

6. The keyboard device according to claim 5, wherein in the second sound-generating process, the electronic controller is configured to generate, as the different signal, a second control signal to control the keyboard driver to drive a drivable key which is drivable by the keyboard driver and is different from the key corresponding to the pitch of the event data read out from the computer storage.

7. The keyboard device according to claim 5, further comprising a sound generator configured to generate a sound signal corresponding to the pitch of the event data read out from the computer storage, wherein in the second sound-generating process, the electronic controller is further configured to generate, as the different signal, a sound generator event signal to cause the sound generator to generate the sound signal which corresponds to the pitch of the event data read out from the computer storage.

8. The keyboard device according to claim 5, further comprising a sound generator configured to generate a sound signal, wherein in the second sound-generating process, when the pitch of the event data read out from the computer storage is higher than a pitch range, the electronic controller is configured to generate, as the different signal, a sound generator event signal to cause the sound generator to generate the sound signal which corresponds to the pitch of the event data read out from the computer storage, the pitch range being a range in which pitches, which correspond to drivable keys that are drivable by the keyboard driver, are included, and when the pitch of the event data read out from the computer storage is lower than the pitch range, the electronic controller is configured to generate, as the different signal, a second control signal to control the keyboard driver to drive a drivable key which is drivable by the keyboard driver and is different from the key corresponding to the pitch of the event data read out from the computer storage.

9. A sound generation control method comprising:

reading out event data from a computer storage;

generating sound based on a first sound-generating process, by driving a key corresponding to a pitch of the event data using a keyboard driver, when the key corresponding to the pitch of the event data is drivable by the keyboard driver, and generating sound based on a second sound-generating process, by driving a different key using the keyboard driver, when the key corresponding to the pitch of the event data is not drivable by the keyboard driver, the different key corresponding to a different pitch that is different from the pitch of the event data.

10. A non-transitory computer readable medium storing a program causing a computer to execute a process, the process comprising:

reading out event data from a computer storage;

generating sound based on a first sound-generating process, by driving a key corresponding to a pitch of the event data using a keyboard driver, when the key corresponding to the pitch of the event data is drivable by the keyboard driver, and generating sound based on a second sound-generating process, by driving a different key using the keyboard driver, when the key corresponding to the pitch of the event data is not drivable by the keyboard driver, the different key corresponding to a different pitch that is different from the pitch of the event data.

11. An electronic controller that executes the program read from the non-transitory computer readable medium according to claim 10.

12. A key drive device comprising:

a keyboard driver configured to drive at least a part of plurality of keys; and the electronic controller according to claim 11.

13. A keyboard device comprising:

a plurality of keys;

a keyboard driver configured to drive at least a part of the plurality of keys;

a communication interface configured to receive event data from outside of the keyboard device; and an electronic controller that includes at least one processor and is configured to acquire the event data via the communication interface from the outside of the keyboard device, the keyboard device being configured such that when a key corresponding to a pitch of the event data acquired from the outside of the keyboard device is drivable by the keyboard driver, sound is generated based on a first sound-generating process in which the keyboard driver is configured to drive the key corresponding to the pitch of the event data acquired from the outside of the keyboard device, and when the key corresponding to the pitch of the event data acquired from the outside of the keyboard device is not drivable by the keyboard driver, sound is generated based on a second sound-generating process in which the keyboard driver is configured to drive a different key corresponding to a different pitch that is different from the pitch of the event data acquired from the outside of the keyboard device.

14. A non-transitory computer readable medium storing a program causing a computer to execute a process, the process comprising:

receiving event data by a communication interface from outside of a keyboard device; and generating sound based on a first sound-generating process, by driving a key corresponding to a pitch of the event data using a keyboard driver, when the key corresponding to the pitch of the event data is drivable by the keyboard driver; and generating sound based on a second sound-generating process, by driving a different key using the keyboard driver, when the key corresponding to the pitch of the event data is not drivable by the keyboard driver, the different key corresponding to a different pitch that is different from the pitch of the event data.

15. An electronic controller that executes the program read from the non-transitory computer readable medium according to claim 14.

16. A key drive device comprising:

a keyboard driver configured to drive at least a part of plurality of keys; and the electronic controller according to claim 15.

* * * * *